(12) United States Patent
Santos et al.

(10) Patent No.: US 7,865,582 B2
(45) Date of Patent: Jan. 4, 2011

(54) SYSTEM AND METHOD FOR ASSIGNING AN APPLICATION COMPONENT TO A COMPUTING RESOURCE

(75) Inventors: Cipriano Santos, Modesto, CA (US); Xiaoyun Zhu, San Jose, CA (US); Dirk Beyer, Walnut Creek, CA (US); Sharad Singhal, Belmont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1560 days.

(21) Appl. No.: 10/915,823

(22) Filed: Aug. 11, 2004

(65) Prior Publication Data

US 2005/0228852 A1    Oct. 13, 2005

Related U.S. Application Data

(63) Continuation-in-part of application No. 10/808,073, filed on Mar. 24, 2004.

(51) Int. Cl.
*G06F 15/173* (2006.01)
*G06F 9/46* (2006.01)

(52) U.S. Cl. .................. 709/223; 718/104; 718/105; 709/201; 709/203; 709/224; 709/225; 713/100

(58) Field of Classification Search .......... 709/201, 709/223, 224, 226; 713/100; 703/2; 718/104, 718/405

See application file for complete search history.

(56) References Cited

U.S. PATENT DOCUMENTS

| | | | |
|---|---|---|---|
| 5,742,778 A | 4/1998 | Hao et al. | |
| 5,914,727 A | 6/1999 | Horan et al. | |
| 5,986,677 A | 11/1999 | Jones et al. | |
| 5,999,198 A | 12/1999 | Horan et al. | |
| 6,304,892 B1 | 10/2001 | Bhoj et al. | |
| 6,308,206 B1 | 10/2001 | Singh | |
| 6,446,125 B1* | 9/2002 | Huang et al. | 709/226 |
| 6,487,455 B1* | 11/2002 | Balasubramanian | 700/2 |
| 6,594,698 B1* | 7/2003 | Chow et al. | 709/226 |
| 6,625,159 B1 | 9/2003 | Singh et al. | |
| 6,734,709 B1 | 5/2004 | Zhu et al. | |
| 6,742,016 B1 | 5/2004 | Bhoj et al. | |
| 6,744,727 B2* | 6/2004 | Liu et al. | 370/228 |
| 6,934,254 B2* | 8/2005 | Brown et al. | 370/232 |

(Continued)

OTHER PUBLICATIONS

Santos et al, "A Mathematical Optimization Approach for Resource Allocation in Large Scale Data Centers," HP Labs Technical Report, HPL-2002-64, Dec. 2002.*

(Continued)

*Primary Examiner*—Dohm Chankong

(57) ABSTRACT

Embodiments of the present invention relate to a system and method for allocating resources to applications. One embodiment of the present invention may include identifying a plurality of applications and a plurality of application components, and determining available resources of a networked computing system for potentially storing the applications and application components. Additionally, the embodiment may include determining required resources for each application component, assigning a subset of available resources for each application component based on the required resources of the application component and the available resources. The embodiment may also include associating the application components with the subsets of available resources and storing more than one application component of the plurality of application components on a single available resource.

18 Claims, 5 Drawing Sheets

U.S. PATENT DOCUMENTS

| | | | |
|---|---|---|---|
| 7,020,758 B2 * | 3/2006 | Fisk | 711/172 |
| 7,146,353 B2 * | 12/2006 | Garg et al. | 1/1 |
| 7,174,379 B2 * | 2/2007 | Agarwal et al. | 709/226 |
| 7,200,609 B2 * | 4/2007 | Schutzman et al. | 707/104.1 |
| 7,203,941 B2 * | 4/2007 | Demsey et al. | 718/1 |
| 7,269,612 B2 * | 9/2007 | Devarakonda et al. | 707/205 |
| 7,272,690 B2 * | 9/2007 | Groves et al. | 711/147 |
| 7,310,673 B2 * | 12/2007 | Zhu et al. | 709/226 |
| 7,334,228 B2 * | 2/2008 | Clohessy et al. | 718/104 |
| 7,437,728 B2 * | 10/2008 | Stackhouse et al. | 718/104 |
| 7,574,343 B2 * | 8/2009 | Levi et al. | 703/13 |
| 7,743,127 B2 * | 6/2010 | Santos et al. | 709/223 |
| 2002/0087665 A1 * | 7/2002 | Marshall et al. | 709/220 |
| 2002/0194251 A1 * | 12/2002 | Richter et al. | 709/105 |
| 2003/0120780 A1 | 6/2003 | Zhu et al. | |
| 2003/0135609 A1 * | 7/2003 | Carlson et al. | 709/224 |
| 2003/0167270 A1 * | 9/2003 | Werme et al. | 707/10 |
| 2004/0073673 A1 | 4/2004 | Santos et al. | |
| 2004/0120330 A1 | 6/2004 | Rhine et al. | |
| 2004/0120331 A1 | 6/2004 | Rhine et al. | |
| 2004/0267897 A1 * | 12/2004 | Hill et al. | 709/217 |
| 2005/0149940 A1 * | 7/2005 | Calinescu et al. | 718/104 |
| 2005/0228850 A1 * | 10/2005 | Zhu et al. | 709/200 |
| 2006/0031444 A1 * | 2/2006 | Drew et al. | 709/223 |

OTHER PUBLICATIONS

Chandra et al, "Dynamic Resource Allocation for Shared Data Centers Using Online Measurements," International Workshop on Quality of Service, pp. 381-400, 2003.*

Chatterjee et al, "Modeling Applications for Adaptive QOS-BAED Resource Management," In the Proceedings of the 2nd IEEE High Assurance Systems Engineering Workshop, Aug. 1997.*

X. Zhu, C. Santos, J. Ward, D. Beyer and S. Singhal, "Resource assignment for large scale computing utilities using mathematical programming ," HP Labs Technical Report, HPL-2003-243, Nov. 2003. http://www.hpl.hp.com/techreports/2003/HPL -2003-243R1.html.*

U.S. Appl. No. 10/808,073, filed Mar. 24, 2004, Xiaoyun Zhu et al., Method and Apparatus for Allocating Resources to Applications.

U.S. Appl. No. 10/856,222, filed May 28, 2004, Xiaoyun Zhu et al., Method for Assigning Network Resources to Applications for Optimizing Performance Goals.

* cited by examiner

SYSTEM AND METHOD FOR ASSIGNING AN APPLICATION COMPONENT TO A COMPUTING RESOURCE

CROSS-REFERENCE TO RELATED APPLICATION

This application is a continuation-in-part of U.S. patent application Ser. No. 10/808,073, filed Mar. 24, 2004 entitled "Method and Apparatus for Allocating Resources to Applications" by Zhu et al.

BACKGROUND

Utility computing may be described as a process of accessing computing resources, capabilities, services, business processes, and/or applications from a utility-like service over a network. A company may use a common infrastructure to provide multiple clients with utility computing service, thus benefiting through economies of scale. Similarly, a client (e.g., a company receiving utility computing services) may use a utility computing service provider to avoid costs associated with providing such services in-house, such as hardware costs, software costs, operation costs, as well as maintenance and support costs. Such a client may benefit financially by only paying for infrastructure and services actually used.

One example of a computing utility may be grid computing, in which spare compute cycles of one entity may be provided for use by another entity. Another example may be a data center, where a large pool of information technology (IT) resources are centrally managed to meet the needs of business critical enterprise applications such as enterprise resource planning applications, database applications, customer relationship management applications, and general e-commerce applications. It should be noted that computing utilities such as these (e.g., grid computing and data center) may require infrastructure and management support.

A large utility computing environment may contain thousands of servers and storage devices connected through a shared high-speed network fabric. The goal of assembling such an environment may be to provide compute, networking, and storage resources to applications as needed. Accordingly, resources may be virtualized and shared across multiple applications to achieve economies of scale and increase return on investment.

Simultaneously managing an infrastructure along with applications may be very complex. However, despite the fact that manual allocation is often inefficient, error prone, and costly, existing data centers typically utilize human operators to manually allocate resources to applications. Accordingly, operation costs and problems with human error may become excessive. Further, for large scale data centers, manual assignment of resources may be extremely difficult.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention facilitate the automatic allocation of resources to applications in a utility computing environment. For example, embodiments of the present invention may allow for automatic resource assignment instead of slow, expensive and error prone resource assignment by human operators.

Figure 1:
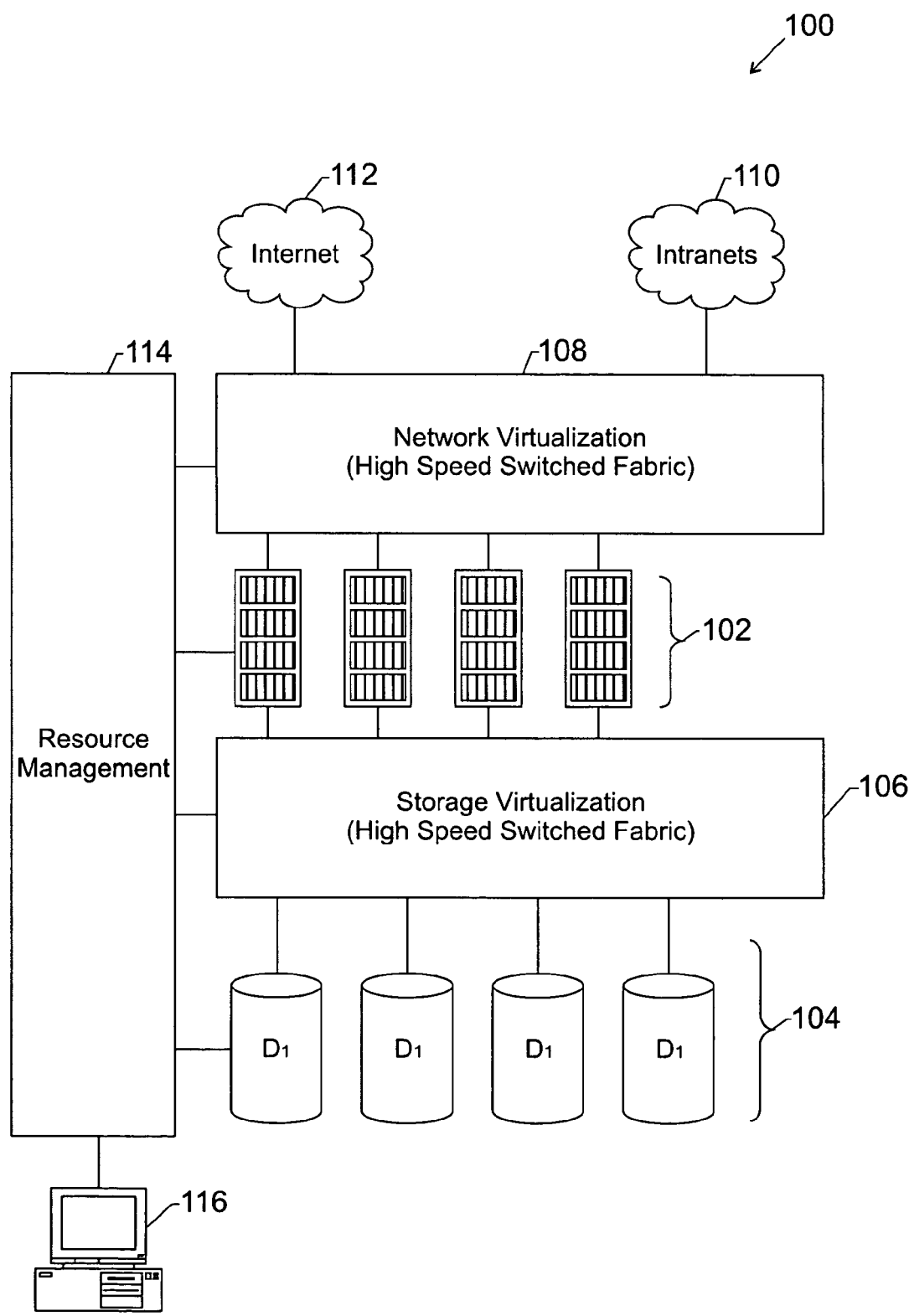
FIG. 1 is a diagram of a utility computing infrastructure in accordance with embodiments of the present invention.

FIG. 1 is a diagram of a utility computing infrastructure in accordance with embodiments of the present invention. In general, the present disclosure relates to a resource assignment problem (RAP) for a large-scale computing utility, such as an Internet data center. Accordingly, FIG. 1 shows a computing utility infrastructure diagram 100 including servers 102 and storage devices 104 that are connected through a shared storage area network (SAN) 106. The storage devices may be "virtualized," meaning that it may appear to the servers 102 and other network entities as though the storage devices 104 are locally connected and controlled. However, the storage devices 104 may actually be remotely connected via the network fabric 106. Further, the physical components (e.g., disk arrays) of the storage devices 104 may be shared among many servers 102 at once.

The servers 102 may also be accessed via a network 108. The computing resources of the servers 102 may be virtualized over the high speed network fabric 108, such that the computing resources (e.g., processing, memory, storage) of each server 102 may be simultaneously shared by numerous applications and users. Further, the applications may access the computing resources internally (e.g., via an intranet 110) or externally (e.g., via the Internet 112).

One goal of the utility computing infrastructure 100 may be to offer "infrastructure on demand," which means that computing, networking, and storage resources are provided to applications as they need them. Accordingly, most of the resources may be virtualized and shared across multiple applications to achieve economies of scale and increase return on investment.

A large-scale utility computing infrastructure 100 may contain thousands of servers 102 and storage devices 104. The complexity of managing such an infrastructure and applications simultaneously may be enormous. Accordingly, automation may be necessary to lower operation costs and reduce human error. Further, well-informed capacity planning and resource provisioning may be required to increase asset utilization and meet service level objectives.

When an application is deployed in a computing utility infrastructure 100, it may be allocated a partition of resources in a virtual application environment to meet the specific needs of the application. As each application's real time workload varies over time, resources can be dynamically re-allocated and re-distributed among all running applications to achieve high resource utilization. In most cases, the physical identities of the allocated resources are transparent to the application due to virtualization of resources.

It may generally be the utility provider's job to choose the right set of physical resources for each application and its components to satisfy the application's configuration and performance requirements, to avoid resource bottlenecks in the infrastructure, to achieve certain goals or enforce certain policies. This decision-making process may be referred to as "resource assignment." Techniques for dealing with this process are an integral part of a resource access management framework that controls the complete lifecycle of applications' access to resources in a computing utility.

In existing data centers, resource assignment may typically be done by human operators, making it slow, expensive, and error prone. Further, as the size of future computing utilities grow to the magnitude of tens of thousands of resources, the number of possibilities to provision a given application may go far beyond the tracking ability of any human. This may call for a more systematic approach to resource assignment, wherein assignments may be automated to significantly shorten application deployment cycles and minimize operator overhead.

In the example infrastructure 100 a resource management application 114 may be used to automatically assign resources. The resource management application 114 may be used for initial resource assignments, as well as dynamically re-allocating resources in operation. Further, the resource management application 114 may run on one or more data processing arrangements, such as a computer 116.

In general, a relatively simple scheme or resource assignment such as random selection or first-come-first-served may not work because there are too many consequences to any particular solution that may be chosen. For instance, the compute requirements of the application may not be met by some of the servers, the latency of the application can be poor, or the cost involved may be too high, and so forth. In particular, since networking resources are shared among different applications and their components, it may be highly likely for a network link to become a bottleneck thus degrading the performance of the applications that share this link. This assumes that network resources are not over-provisioned, and relatively high utilization on these resources is desired. Therefore, resource assignment may be a highly complex problem that requires more intelligent solution techniques.

Generally, every application to be deployed in a computing utility has high-level requirements such as number of concurrent users, number of transactions per second and infrastructure cost. Usually the mapping between these requirements and the specific identities of the resources that are used to host the application may not be straightforward. This mapping may be broken down into two steps, 1) determining resource requirements, and 2) mapping those requirements to available resources.

Figure 2:
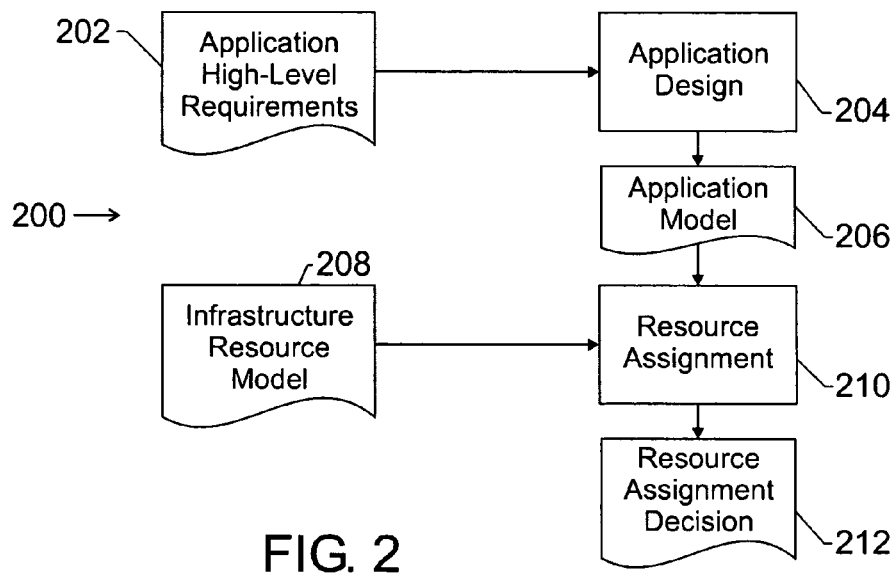
FIG. 2 is a diagram illustrating a two-step process for mapping requirements to resources in accordance with embodiments of the present invention.

FIG. 2 is a diagram illustrating a two-step process 200 for mapping requirements to resources in accordance with embodiments of the present invention. The first block is referred to as "application design" 204, and involves translating the application's high-level requirements 202 into an application model 206 that represents the low-level processing, communication and storage requirements on the physical resources. The application design block 204 requires domain knowledge and experience with the specific application, and typically involves benchmarking exercises.

The application model 206 may be used together with an infrastructure resource model 208 as input to the next block, resource assignment 210. Resource assignment 210 involves deciding whether sufficient server and network resources exist in the infrastructure to accommodate the application's resource requirements, and if so, choosing the specific instances of resources from the infrastructure for use by the applications. If, however, resource assignment 210 decides that no sufficient resources exist, then the application may be denied admission into the computing utility. The resource assignment block 210 requires knowledge of both the physical resources and application requirements contained in the application and resource models 206, 208. The resulting resource assignment decision (block 212) is then fed into an application deployment engine, which configures the switches and servers and installs associated application components on the servers.

The concepts described herein are generally directed to solving the second block, resource assignment 210. The resource assignment problem (RAP) may be defined as follows: For a given topology of a network consisting of switches and servers with varying capabilities, and for a given application with a distributed architecture, decide which server from the physical network should be assigned to each application component, such that the traffic-weighted average inter-server distance is minimized, and the application's processing, communication and storage requirements are satisfied without exceeding network capacity limits. Further, embodiments of the present invention may address a reformulation of the RAP with two extensions. Regarding the first extension, a generalized tree topology for the Ethernet fabric may be used. More specifically, instead of having edge switches (e.g., switches that connect other switches) and rack switches (e.g., switches that connect servers in a rack to another switch or set of servers), the LAN fabric may simply consist of a set of switches and a set of processing nodes connected in a tree topology. Regarding the second extension, a new model may be introduced that accommodates a scenario where multiple application components are assigned to the same server. This extension may transform the RAP from a pure assignment problem to a combination of assignment and bin-packing problem.

Accordingly, embodiments of the present invention may allow several issues to be addressed when resources are assigned to applications. In one example, an application's processing, communication, and storage requirements may be met by the assigned resources. In another example, an application's performance goal (e.g., minimizing internal communication delay) may be achieved. Additionally, embodiments may allow multiple applications and/or application components to co-exist on the same infrastructure without interfering with performance. Further, embodiments of the present invention may enable many distributed applications (e.g., enterprises applications, Web applications, engineering jobs, etc.) to be deployed in utility computing environments (e.g., Hewlett Packard's Utility Data Centers (UDCs)) in an automated fashion such that the complexity of provisioning an application can be embedded in the management software. Accordingly, embodiments may reduce data center operator overhead, shorten the time for application deployment, and lower the cost for resource management. In addition, embodiments may reduce provisioning error and provide better scalability.

Figure 3:
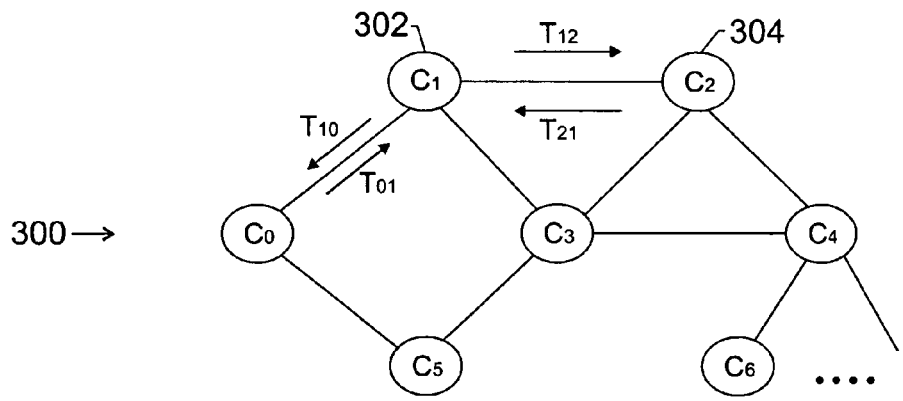
FIG. 3 is a graph illustrating an application model diagram in accordance with embodiments of the present invention.

FIG. 3 is a graph illustrating an application model diagram in accordance with embodiments of the present invention. An application can be characterized by a set of components that communicate with one another in a certain way. The application can be represented by a directed graph G(C, L) 300, where each node c∈C (e.g., 302, 304) represents an application component, and each directed edge l=(c, c')∈L (as represented by the lines connecting the components) is an ordered pair of component nodes, representing communication from component c to component c'. The component co may be an artificial component representing the outside world to the application. For example, co may be the Internet that the application is communicating with. The matrix T may be defined to characterize the traffic pattern of the application and traffic between all component pairs. Each element $T_{cc'}$ represents the maximum amount of traffic going from component c to component c'. $T_{cc'}=0$ if an edge (c,c') does not exist, indicating no traffic flows from component c to component c'. Further, in the traffic matrix T, $T_{c0}$ represents the amount of traffic going out of component c to the Internet, and $T_{0c}$ represents the amount of traffic coming into component c from the Internet.

The mathematical model for the component-based architecture illustrated in FIG. 3 may contain the sets and parameters in Table 1A below. It should be noted that ∈ generally denotes an "element of," ∪ generally denotes a "union," and dim generally represents "dimension."

TABLE 1A

Sets and indices

| | |
|---|---|
| c ∈ C: | Set of application components. |
| l ∈ L: | Set of directed links in the application architecture graph. Each link l = (c, c') is an ordered pair of two components c and c' in C. |
| c' ∈ $N_c$: | Set of components that communicate with component c, i.e., $N_c = \{c' \in C: (c, c') \in L\}$. |

Parameters:

| | |
|---|---|
| T: | $|C| \times |C|$ -dim matrix. $T_{cc'}$ is the amount of communication traffic from component c to component c'. |
| $TO_c = \sum_{c' \in N_c} T_{cc'}$: | Total amount of LAN traffic going out of component c. |
| $TI_c = \sum_{c' \in N_c} T_{c'c}$: | Total amount of LAN traffic coming into component c. |
| $VREQ_{ac}$: | Required value set of non-capacitated attribute (e.g., a characteristic that is present or not present) $a \in A^{noncap}$ by component c. |
| $CREQ_{ac}$: | Required capacity of capacitated attribute (e.g., a characteristic that is numerically quantifiable) $a \in A^{lin} \cup A^{nonlin}$ by component c. |

Each application component has requirements on the type of servers on which it can be hosted. For each non-capacitated server attribute (e.g., processor type, operating system type), each application component has a set of allowable values (e.g., {PA-RISC 2.0, ULTRA SPARC}). For each capacitated server attribute (e.g., disk space or amount of space on another type of tangible computer-readable medium, processing speed), each application component has a minimum required capacity (e.g., 2 CPUs, 1.5 GB RAM). These requirements will be compared to each server's attribute values for making assignment decisions. Let P be the set of server attributes (or properties) that are of interest to a particular application, such as processor type, processor speed, number of processors, memory size, disk space, and so on. Then for each attribute p ∈P and each application component c ∈C , the requirement is characterized by a set $VREa_{cp}$, which contains the permissible values of attribute p for component c. This set may be either discrete or continuous. For example, an application component may require a server's processor architecture to be in {SPARC, PA_RISC}, and its processor speed to be in an interval [500, 1000] (in MHz).

Embodiments of the present invention may deal with a plurality of component types. An application component may be generally classified into one of two categories in terms of server sharing. One category may be referred to as Type I and a second category may be referred to as Type II. A Type I category component may require a dedicated server. In contrast, a Type II category component may share a server with other components. Specifically, embodiments of the present invention may deal with both Type I and Type II components by allowing a single server to be assigned to multiple Type II components at the same time. Let $C^1$ denote the subset of components that are Type I, and $C^m$ be the subset of components that are Type II. Then $C=C^1 \cup C^m$ and $C^1 \cap C^m = 0$.

Embodiments of the present invention may decide or facilitate deciding which server in a tree network should be assigned to each application component or subset of Type II components. For example, embodiments of the present invention may make decisions such that the average network distance between all components is minimized, where distance is measured in terms of network hops. Similarly, embodiments of the present invention may insure that attribute requirements for all the application components are satisfied and that communication traffic between servers does not exceed link capacities in the LAN.

Figure 4:
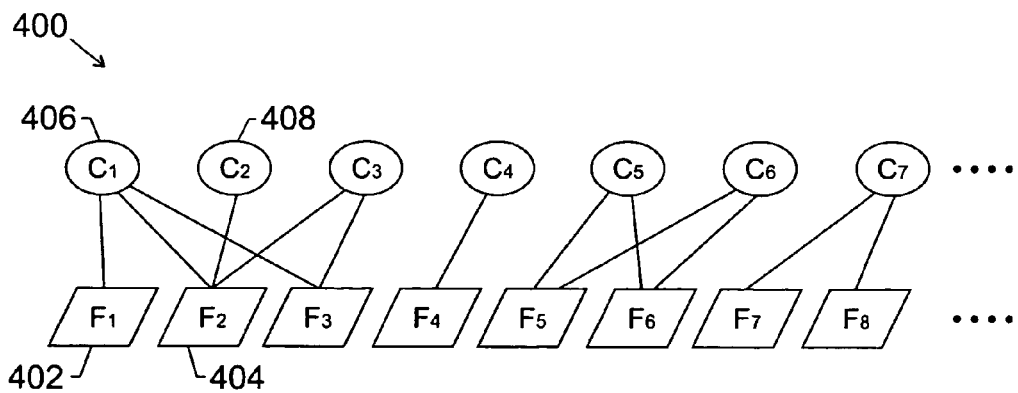
FIG. 4 is a graph illustrating a model for storage requirements in accordance with embodiments of the present invention.

FIG. 4 is a graph illustrating a model for storage requirements in accordance with embodiments of the present invention. The storage access pattern of applications can be represented by a bipartite graph 400. It may be assumed that data for an application can be divided into a set of "files" (e.g., 402, 404). Here a file may represent any logically contiguous chunk of data that may be accessed by application components (e.g., 406, 408). The example illustrates that the mapping between an application component and a file is not one-to-one. More specifically, each component may access multiple files, and each file may be accessed by more than one component. With this in mind, the application model contains the following sets and parameters that capture the application's storage requirements, in addition to those defined in Table 1A.

TABLE 1B

Sets and Indices:

| | |
|---|---|
| f ∈ F: | Set of files to be placed on storage devices. |

Parameters:

| | |
|---|---|
| TCF: | $|C| \times |F|$-dim matrix. $TCF_{cf}$ is the amount of write traffic from component c to file f. |
| TFC: | $|F| \times |C|$-dim matrix. $TFC_{fc}$ is the amount of read traffic from file f to component c. |

The above application model can be used for simultaneous assignment of resources to multiple applications. A single large graph may be constructed with all the components from all the applications, where each application is represented by a sub-graph.

The following paragraphs describe the mathematical models for the processing, networking and storage resources in a computing utility. The collection of resources as a whole is referred to as the "utility fabric", which includes servers that can be assigned to applications, the local area networking (LAN) fabric (e.g., Ethernet) that connects the servers to each other, and the storage area network (SAN) fabric that connects the servers to the centralized storage devices.

Let S be the set of servers in the physical network. The notion of a "server" here is not restricted to a compute server. The server may be a firewall, a load balancer, a network attached storage (NAS) device, a VPN (virtual private network) gateway, or any other device an application may need as a component. An attribute "server type" is used to distinguish between different kinds of servers. Because of the inherent heterogeneity of resources in a large computing utility, even the same type of servers may have different processor architecture and processing power. Therefore, more attributes are used to describe a server. The value for each attribute may be fixed, or configurable. For example, a server may have an "IA32" architecture, a CPU speed of 550 MHZ, but its memory size may be changeable between 4 and 8 MB. For each server s∈S, the set $V_{sp}$ is used to represent its possible values for attribute p∈P.

Before describing the mathematical models for the networking fabric, a common set of networking assumptions may be made to simplify the models. All the network links are assumed to be duplex links and traffic can flow in either direction. In addition, link capacities for the two directions can be different. For any physical link in any direction, its "link capacity" may indeed be the minimum of the bandwidth capacities of the link, the source port and the destination port.

Multiple physical links between two devices that are all active and load balanced may be combined into one logical link with aggregated capacity. For example, four 1 Gbit/sec physical links can be combined to form one 4 Gbit/sec link in the logical topology. This simplification may be valid when the combined links have equal bandwidth and share approximately equal load, which is typically true. This may also be the case if trunking technology is applied on the links.

If two switches appear in a redundant pair to avoid single point of failure, then redundant paths exist between at least one pair of devices in the physical topology. This can be simplified in different ways depending on the network protocol the switches implement. For example, in the LAN fabric, the spanning tree protocol may be enforced, resulting in all the redundant paths between two network devices being blocked except one. If two switches in a redundant pair are both active and being load balanced, then the switches or servers that are connected to these two switches can be partitioned into two sets, one under each switch. Further, the cross links will be blocked.

Similarly, the SAN fabric may implement the Fabric Shortest Path First (FSPF) protocol, which assures uniform traffic load sharing over equivalent paths. Moreover, the two links in the same segment of the two paths usually have the same bandwidth. As a consequence, a pair of redundant switches can be merged into one switch. Corresponding links will also be merged to form a bigger link with aggregated bandwidth.

These simplifying assumptions may be applied to both the LAN and the SAN fabrics as they are represented using mathematical models. It may be assumed that the logical topology of the LAN fabric in the computing utility is a tree. This assumption may be based in part on the fact that a layer-two switched network may implement the spanning tree protocol, which may guarantee that there is one and only one active path between two network devices. The tree network topology significantly simplifies the formulation of the problem later on.

Figure 5:
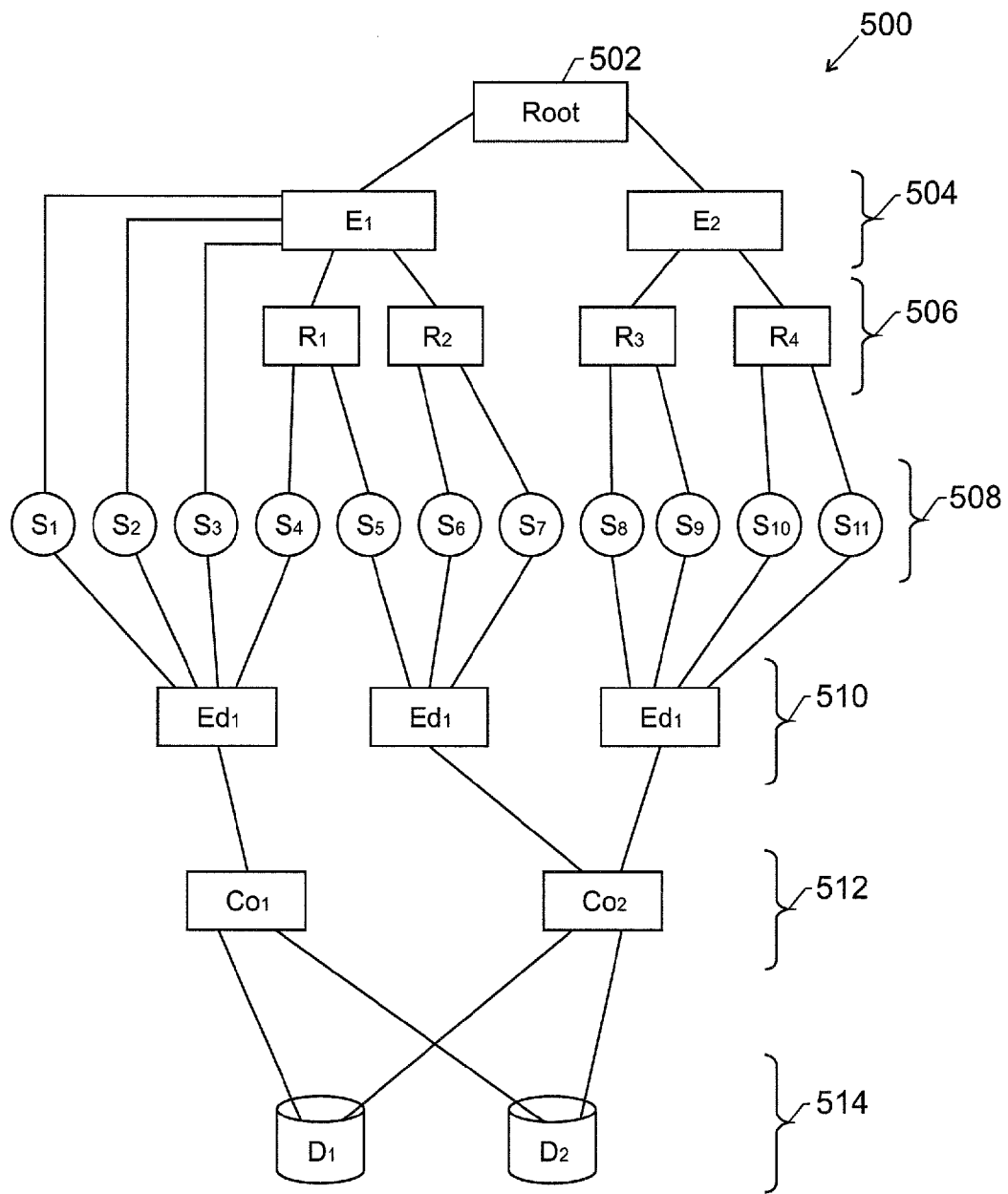
FIG. 5 is a diagram illustrating an exemplary LAN fabric topology in accordance with embodiments of the present invention.

FIG. 5 is a diagram illustrating an exemplary LAN fabric topology 500 in accordance with embodiments of the present invention. At the top is a switching/routing device 502 that connects the utility fabric to the Internet or other utility fabrics. This device 502 may be referred to as a root switch. Below the root switch 502 is a set of edge switches 504, and below the edge switches 504 is a set of rack switches 506. Servers 508 are directly connected to either an edge switch 504 or a rack switch 506. As the figure shows, an edge switch 504 can be connected to a set of rack switches 506, a set of servers 508, or a combination of both.

The three-layer network shown in FIG. 5 is chosen for demonstration purposes. It will be appreciated that the models described herein may be adapted for any LAN fabric topology that can be represented as a tree. Therefore the methodology described herein may be applied to a tree network with fewer layers or more layers.

The mathematical model for the LAN contains the following sets and parameters shown below in Table 2.

TABLE 2

| Sets and Indices | |
|---|---|
| s ∈ S: | Set of servers. |
| r ∈ R: | Set of rack switches in the LAN. |
| e ∈ E: | Set of edge switches in the LAN. |
| $R_e \subset R$: | Set of rack switches connected to edge switch e in the LAN. |
| $SR_r \subset S$: | Set of servers connected to LAN rack switch r. |
| $SE_e \subset S$: | Set of servers connected (directly or indirectly) under LAN edge switch e. |
| p ∈ P: | Set of server attributes required by the application. |
| Parameters: | |
| $BSI_s$: | The incoming bandwidth of server s. |
| $BSO_s$: | The outgoing bandwidth of server s. |
| $BRI_r$: | The incoming bandwidth of rack switch r. |
| $BRO_r$: | The outgoing bandwidth of rack switch r. |
| $BEI_e$: | The incoming bandwidth of edge switch e. |
| $BEO_e$: | The outgoing bandwidth of edge switch e. |
| $V_{sp}$: | Set of possible values for attribute p of server s. |

For easy indexing, each logical link in the network may be associated with a device with which it may be uniquely identified. For example, the link that connects server s to a rack or edge switch is associated with that server and its downstream/upstream bandwidth is referred to as the incoming/outgoing bandwidth of server s. The same rule applies to the links at the upper layers.

Various SAN topologies have been used in practice. The popular ones include ring, cascade, mesh, and core/edge topologies. Among these, the core/edge topology may provide resiliency, scalability, flexibility and throughput, and may be adopted by many vendors and SAN designers. Therefore, it may be assumed that the SAN fabric in a computing utility has a core/edge topology. The lower portion of FIG. 5 exemplifies a SAN with this topology. However, it should be noted that while a core/edge topology is common, other topologies may be used in other embodiments.

The core/edge topology contains two layers of switches. The core layer consists of at least one pair of redundant core switches 512 that are typically the most powerful. All the other switches connected to the core switches 512 are referred to as edge switches 510. The centralized storage devices 514, such as disk arrays, are attached directly to the core switches 512, and the servers 508 are attached directly to the edge switches 510. The above topology ensures that every storage device 514 is accessible by any server 508 in the SAN. Note that this logical topology may be a simplification from the physical topology with redundancies in network devices and links.

The mathematical model for the SAN contains sets and parameters shown below in Table 3.

TABLE 3

| Sets and indices: | |
|---|---|
| s ∈ S: | Set of servers. |
| d ∈ D: | Set of storage devices. |
| k ∈ K: | Set of FC core switches in the SAN. |
| g ∈ G: | Set of FC edge switches in the SAN. |
| $SED_g \subset S$: | Set of servers connected to FC edge switch g. |
| $SCO_k \subset S$: | Set of servers (indirectly) connected to FC core switch k. |
| Parameters: | |
| BDC: | $|D| \times |K|$-dim matrix. $BDC_{dk}$ is the bandwidth of the FC link going from storage device d to core switch k. |
| BCD: | $|K| \times |D|$-dim matrix. $BCD_{kd}$ is the bandwidth of the FC link going from core switch k to storage device d. |
| BCE: | $|G|$-dim vector. $BCE_g$ is the bandwidth of the FC link going from a core switch to edge switch g. |
| BEC: | $|G|$-dim vector. $BEC_g$ is the bandwidth of the FC link going from edge switch g to a core switch. |
| BES: | $|S|$-dim vector. $BES_s$ is the bandwidth of the FC link going from an edge switch to server s. |
| BSE: | $|S|$-dim vector. $BSE_s$ is the bandwidth of the FC link going from server s to an edge switch. |

The resource assignment problem concerns selecting the right server in the utility fabric for each application component, represented by the following matrix of binary variables: For all c∈C and s∈S, $$x_{cs} = \begin{cases} 1 & \text{server } s \text{ assigned to component } c; \\ 0 & \text{otherwise.} \end{cases}$$

In addition, the following two matrices of binary variables are defined. For all c∈C, r∈R, and e∈E, $$zr_{cr} = \begin{cases} 1 & \text{rack switch } r \text{ assigned to component } c; \\ 0 & \text{otherwise.} \end{cases}$$

$$ze_{ce} = \begin{cases} 1 & \text{edge switch } e \text{ assigned to component } c; \\ 0 & \text{otherwise.} \end{cases}$$

It may be assumed a switch is assigned to a component if at least one server connected (directly or indirectly) under the switch is assigned to that component. Note that these two variables are redundant to the variables $x_{cs}$. They are introduced to help express the network constraints such as Ethernet bandwidth constraints in a more succinct way, and to make solving of the problem more efficient.

Resources in a computing utility can be assigned to application components based on many criteria, such as application performance, resource utilization, operator policies, or economic concerns. These can be associated with different objective functions of the optimization problem. As formulated herein, the objective function used in the node placement optimization problem is chosen, which minimizes the traffic-weighted average inter-server distance where distance is measured in terms of network hop count. Let $DIST_{ss'}$ be the distance between two servers s and s', and $TSS_{ss'}$ be the amount of LAN traffic from server s to server s' as a result of server assignment. Then the objective function is:

$$\text{Min } J1 = \sum_{s,s' \in S} DIST_{ss'} * TSS_{ss'}.$$

As may be apparent, $$TSS_{ss'} = \sum_{c \in C} \sum_{c' \in N_c} x_{cs} T_{cc'} x_{c's'}.$$

The value of $DIST_{ss'}$ depends on the relative location of server s and s'. For example, $DIST_{ss'}=2$ if both servers are directly connected to the same switch, which may be a preferred situation if these two servers communicate heavily.

By dividing the set of all server pairs into a number of subsets, each with a different $DIST_{ss'}$ value, then calculating the summation on each subset and adding them up, this results in:

$$J1 = 2\sum_{c \in C}(TO_c + TI_c) + \sum_{r \in R}\sum_{c \in C} zr_{cr}(TO_c + TI_c) - 2\sum_{r \in R}\sum_{c \in C}\sum_{c' \in N_c} zr_{cr}T_{cc'}zr_{c'r} - \sum_{e \in E}\sum_{c \in C}\sum_{c' \in N_c} 2ze_{ce}T_{cc'}ze_{c'e}.$$

The first term is the total amount of traffic originated from and received by all the components, which is a constant. Therefore, an equivalent objective function follows:

$$\text{Min } J2 = \sum_{r \in R}\sum_{c \in C} zr_{cr}(TO_c + TI_c) - 2\sum_{r \in R}\sum_{c \in C}\sum_{c' \in N_c} zr_{cr}T_{cc'}zr_{c'r} - \sum_{e \in E}\sum_{c \in C}\sum_{c' \in N_c} 2ze_{ce}T_{cc'}ze_{c'e}.$$

This is a quadratic function of the binary variables $zr_{cr}$ and $ze_{ce}$. The first term represents the total amount of traffic originated and received under all the rack switches. A similar term for all the edge switches, $$\sum_{e \in E}\sum_{c \in C} ze_{ce}(TO_c + TI_c),$$

would have been present, but was removed as part of the constant term. The second and third terms together capture the total amount of intra-switch traffic at all the switches. Here "intra-switch traffic" is defined as the traffic flows whose source and destination nodes are servers under the same switch. As components that communicate heavily are placed close to each other in the network, the amount of intra-switch traffic may be increased, which in turn may result in smaller value for the objective function. In general, this leads to lower communication delay between application components inside the LAN fabric.

SAN latency may not be included in the objective function for the following two reasons. First, the SAN topology in this problem has the property that the number of hops for each data flow is fixed at three because any server and storage device pair is connected through two FC switches. This means, any server assignment solution results in the same SAN latency measure. Second, storage systems latency may be dominated by I/O access at the storage device, which is typically several orders of magnitude larger than the SAN latency. Therefore, even if the number of hops could be reduced between a server and a storage device, it may be inconsequential with respect to storage access latency. On the other hand, link capacity in the SAN is usually a concern in storage systems performance. Given the high cost of SAN switches, grossly over-provisioning may not be preferred, while at the same time it may not be desirable to allow the SAN fabric to be easily saturated. With this observation, the SAN link capacity in RAP may be handled without adding any new objective function. The rest of this section describes constraints in the problem that limit the search space for optimal server assignment solutions.

Before describing constraints in the RAP, a server feasibility matrix FS is defined, where:

$$FS_{cs} = \begin{cases} 1 & \text{switch } s \text{ meets the processing, networking,} \\ & \text{and } I/O \text{ requirements of component } c; \\ 0 & \text{otherwise.} \end{cases}$$

More specifically, $FS_{cs}=1$ if and only if $$V_{sp} \cap VREQ_{cp} \neq \phi, \forall p \in P \quad (1)$$

$$\sum_{c' \in N_c} T_{c'c} \leq BSI_s \text{ and } \sum_{c' \in N_c} T_{cc'} \leq BSO_s \quad (2)$$

$$\sum_{f \in F} TCF_{cf} \leq BSE_s \text{ and } \sum_{f \in F} TFC_{cf} \leq BES_s \quad (3)$$

Condition (1) ensures that server s matches the server attribute requirement by component c. Condition (2) ensures that the aggregate LAN traffic at each component c does not exceed the link bandwidth of server s in either direction. And condition (3) guarantees that the total amount of SAN traffic at each component c does not exceed the I/O bandwidth of server s in either direction.

The server feasibility matrix can be pre-computed before the optimization problem is solved. When the matrix FS is sparse, the search space for the optimization problem may be significantly reduced.

Similarly, feasibility matrices FR and FE can be defined for rack and edge switches, respectively, where $FR_{cr}=1$ if there is at least one feasible server under rack switch r for component c, $FE_{ce}=1$ if there is at least one feasible server under edge switch e for component c. These two matrices can also be pre-computed.

The constraints on the decision variables are as follows.

Normality constraints: One and only one server is assigned to each application component:

$$\sum_{s \in S} x_{cs} = 1, \forall c \in C. \quad (4)$$

Each server can be assigned to at most one component:

$$\sum_{c \in C} x_{cs} \leq 1, \forall s \in S. \quad (5)$$

Variable relationship constraints: A rack switch is assigned to a component if and only if a server under this rack switch is assigned to this component:

$$\sum_{s \in SR_r} x_{cs} = zr_{cr}, \forall c \in C, r \in R. \quad (6)$$

An edge switch is assigned to a component if and only if a server under this edge switch is assigned to this component:

$$\sum_{s \in SE_e} x_{cs} = ze_{ce}, \forall c \in C, e \in E. \quad (7)$$

LAN fabric constraints: The LAN traffic going out of each rack switch to an edge switch may not exceed the link capacity:

$$\sum_{c \in C} TO_c zr_{cr} - \sum_{c \in C} \sum_{c' \in N_c} zr_{cr} T_{cc'} zr_{c'r} \leq BRO_r, \forall r \in R. \quad (8)$$

$TO_c$ may be the total amount of LAN traffic originating from component c. On the left hand side, the first item represents the total amount of traffic originating under rack switch r, and the second item represents the amount of intra-switch traffic at this switch. Hence, the left hand side represents the amount of traffic passing through switch r, which should be bounded by the outgoing link bandwidth at the switch.

The derivation of the following three constraints is similar, therefore will be omitted. The LAN traffic coming into each rack switch from an edge switch does not exceed the link capacity:

$$\sum_{c \in C} TI_c zr_{cr} - \sum_{c \in C} \sum_{c' \in N_c} zr_{cr} T_{cc'} zr_{c'r} \leq BRI_r, \forall r \in R. \quad (9)$$

Remember that $TI_c$ is the total amount of LAN traffic received by component c.

The LAN traffic going out of each edge switch to the root switch may not exceed the link capacity:

$$\sum_{c \in C} TO_c ze_{c,e} - \sum_{c \in C} \sum_{c' \in Nc} ze_{ce} T_{cc'} ze_{c'e} \leq BEO_e, \forall\, e \in E. \quad (10)$$

The LAN traffic coming into each edge switch from the root switch may not exceed the link capacity:

$$\sum_{c \in C} TI_c ze_{ce} - \sum_{c \in C} \sum_{c' \in Nc} ze_{ce} T_{cc'} ze_{c'e} \leq BEI_e, \forall\, e \in E. \quad (11)$$

SAN fabric constraints: The SAN traffic going out of each FC edge switch to a core switch may not exceed the link capacity:

$$\sum_{s \in SED_g} \sum_{f \in F} \sum_{c \in C} TCF_{cf} x_{cs} \leq BEC_g, \forall\, g \in G. \quad (12)$$

The SAN traffic coming into each FC edge switch from a core switch may not exceed the link capacity:

$$\sum_{s \in SED_g} \sum_{f \in F} \sum_{c \in C} TFC_{fc} x_{cs} \leq BCE_g, \forall\, g \in G. \quad (13)$$

The SAN traffic from an FC core switch to a storage device may not exceed the link capacity:

$$\sum_{s \in SCO_k} \sum_{f \in F} \sum_{c \in C} TCF_{cf} x_{cs} Y_{fd} \leq BCD_{kd}, \forall\, k \in K, d \in D. \quad (14)$$

Here $Y_{fd}$ is a binary parameter, where $Y_{fd}=1$ if and only if file f is placed on storage device d. The file placement problem can be separated from the server assignment problem. The former has $Y_{fd}$ as its decision variable. The solution may be fed into the RAP problem as an input.

The SAN traffic from a storage device to an FC core switch may not exceed the link capacity.

$$\sum_{s \in SCO_k} \sum_{f \in F} \sum_{c \in C} TFC_{fc} x_{cs} Y_{fd} \leq BDC_{dk}, \forall\, k \in K, d \in D \quad (15)$$

Feasibility constraints: All the variables are binary, and all the assigned servers, rack switches, and edge switches are feasible.

$$x_{cs} \in \{0, FS_{cs}\}, zr_{cr} \in \{0, FR_{cr}\}, ze_{ce} \in \{0, FE_{ce}\} \quad (16)$$

In summary, the complete formulation of the optimization problem for RAP is $$\text{Min } J2 = \sum_{r \in R} \sum_{c \in C} zr_r(TO_c + TI_c) -$$

$$2 \sum_{r \in R} \sum_{c \in C} \sum_{c' \in N_c} zr_{cr} T_{cc'} zr_{c'r} - \sum_{e \in E} \sum_{c \in C} \sum_{c' \in Nc} 2 ze_{ce} T_{cc'} ze_{c'e}$$

subject to (4)-(16) above. This may be a nonlinear combinatorial optimization problem, which may be NP-hard (Non-deterministic Polynomial-time hard), which refers to the class of decision problems (a problem where all the answers are YES or NO) that contains all problems H such that for all decision problems L in non-deterministic polynomial-time (NP) there is a polynomial-time many-one reduction to H. This problem is referred to as the original formulation of RAP and labeled as RAP0. The problem formulation described above may be applied to a number of different use cases, some of which are shown in Table 4. It should be noted that NP may refer to a set of decision problems that is solvable in polynomial time on a non-deterministic Turing machine (an abstract model of computer execution and storage). Alternatively, NP may refer to a set of decision problems that can be reformulated as a binary function A(x, y) over strings such that for a certain constant number c a string x is an element of the original decision problem if there is a string y with length smaller than |x|c such that A(x, y), the function A is decidable in polynomial time by a Turing machine. It may further be noted that a polynomial-time many-one reduction (also known as polynomial transformation or Karp reduction) is a certain way to reduce one decision problem to another one in such a way that any algorithm solving the latter immediately yields an algorithm solving the former, with only a modest slow-down.

TABLE 4

| Use Case | Description |
|---|---|
| Green-field assignment | This occurs when the first application is initially deployed in an empty utility. |
| Subsequent assignment | This occurs when there are existing applications running in the utility, and resources are assigned to the next application. In this case, the same application and resource models can be used, except that parameters in the resource model should reflect the remaining resource capacity. |
| Multiple applications assignment | This occurs when resources need to be assigned to more than one application at the same time. A larger application model with components from multiple applications can be used for this purpose. |
| Dynamic assignment | This occurs when an existing application requests for more resources as its real time workload intensity changes. In this case, a new application model will be submitted containing the additional requirement. Depending on the application's ability to accommodate server migration, the problem can be resolved with or without fixing the existing server assignment. |
| Automatic fail over | This occurs when a server without high-availability configuration fails and needs replacement. The best server to use from the pool of available servers can be found using a similar RAP formulation |

The first three use cases may happen at application deployment time, while the last two use cases may be useful at run time. Therefore, the former is at a time scale of days or longer, while the latter may be at a shorter time scale of minutes or hours.

The number of binary variables in RAP0 is $|C| \times (|S|+|R|+|E|)$, which may be dominated by $|C| \times |S|$, the number of application components times the number of servers in the utility. It is conceivable that the problem becomes computationally more challenging as the infrastructure size or application size grows. Any heuristic search algorithms are not guaranteed to find a feasible and optimal solution. The next section presents two linearized formulations as mixed integer programming problems, which can be solved directly using a commercial solver, such as CPLEX.

As previously described, the original formulation RAP0 is nonlinear because the objective function and the LAN fabric constraints (8)-(11) are quadratic in binary variables $zr_{cr}$ and $ze_{ce}$. This type of nonlinearity can be removed using a standard substitution technique with the observation that the product of binary variables is also binary. First, the following set of binary variables are defined, $yr_{cc'r}=zr_{cr}zr_{c'r}$ and $ye_{cc'e}=ze_{ce}ze_{c'e}$, for all c,c'∈C, r∈R, e∈E.

With these new variables, the objective function can be rewritten as $$\text{Min } J2 = \sum_{r \in R}\sum_{c \in C} zr_{cr}(TO_c + Tl_c) - 2\sum_{r \in R}\sum_{c \in C}\sum_{c' \in N_c} T_{cc'} yr_{cc'r} - 2\sum_{e \in E}\sum_{c \in C}\sum_{c' \in N_c} T_{cc'} ye_{cc'e}.$$

This is a linear combination of all the $zr_{cr}$, $yr_{c'cr}$ and $ye_{cc'e}$ variables. Similarly, constraints (8) through (11) in RAP0 can be rewritten as linear constraints as follows:

$$\sum_{c \in C} TO_c zr_{cr} - \sum_{c \in C}\sum_{c' \in N_c} T_{cc'} yr_{cc'r} \le BRO_r, \forall r \in R \quad (17)$$

$$\sum_{c \in C} Tl_c zr_{cr} - \sum_{c \in C}\sum_{c' \in N_c} T_{cc'} yr_{cc'r} \le BRI_r, \forall r \in R \quad (18)$$

$$\sum_{c \in C} TO_c ze_{ce} - \sum_{c \in C}\sum_{c' \in N_c} T_{cc'} ye_{cc'e} \le BEO_e, \forall e \in E \quad (19)$$

$$\sum_{c \in C} Tl_c ze_{ce} - \sum_{c \in C}\sum_{c' \in N_c} T_{cc'} ye_{cc'e} \le BEI_e, \forall e \in E. \quad (20)$$

Additional constraints are used to ensure that the $yr_{cc'r}$ variables behave as the product of binary variables. First, to ensure that $zr_{cr}=0$ or $zr_{c'r}=0 \Rightarrow yr_{cc'r}=0$, the following is used:

$$zr_{cr} \ge yr_{cc'r}, zr_{c'r} \ge yr_{cc'r} \forall c,c' \in C, r \in R. \quad (21)$$

Second, to ensure $zr_{cr}=1$ and $zr_{c'r}=1 \Rightarrow yr_{cc'r}=1$, the following constraint is used:

$$zr_{cr}+zr_{c'r}-yr_{cc'r} \le 1 \forall c,c' \in C, r \in R.$$

However, because the objective function may be to maximize a summation of the $yr_{cc'r}$ variables with non-negative coefficients, the second set of constraints are implied by the first set of constraints at optimality, and therefore are not required. Similarly, the following set of constraints should be imposed on the new yecc variables:

$$ze_{ce} \ge ye_{cc'e}, ze_{c'e} \ge ye_{cc'e} \forall c,c' \in C, e \in E.$$

It should be noted that the new $yr_{cc'r}$ and $ye_{cc'e}$ variables only need to be continuous in the interval [0,1] instead of being binary. For example, based on the above discussion, constraint (21) and the maximization nature of the objective function together helps to ensure that $yr_{cc'r}$ behaves exactly as the product of $zr_{cr}$ and $zr_{c'r}$. Since $zr_{c'r}$ and $zr_{cr}$ are both binary, $yr_{cc'r}$ never really takes a fractional value between 0 and 1.

The above substitution of variables results in a linear optimization problem with some integer variables and some continuous variables, thus a mixed integer programming problem. It is referred to as RAP-LINI, to be distinguished from the original nonlinear formulation RAP0. The main issue with this formulation is that the number of variables may be significantly higher than that of RAP0 with the introduction of $|C|\times|C|\times(|R|+|E|)$ continuous variables. There are a number of ways to improve the efficiency in solving the problem.

First, the number of $yr_{cc'r}$ and $ye_{cc'e}$ variables can be reduced in the following way: $yr_{cc'r}$ is defined if and only if $FR_{cr}=1$, $FR_{c'r}=1$, and $T_{cc'}>0$; and $ye_{cc'e}$ is defined if and only if $FE_{ce}=1$, $FE_{c'e}=1$, and $T_{cc'}>0$. In all the other cases, the $yr_{cc'r}$ and $ye_{cc'e}$ variables are not needed in the formulation. This implies that, in the worst case where all the rack and edge switches are feasible for all the components, the number of extra variables in RAP-LINI is $|L|\times(|R|+|E|)$, i.e., the number of communication links in the application graph times the total number of LAN switches.

A second way of improving efficiency is to realize that, since the number of $zr_{cr}$ and $ze_{ce}$ variables ($|C|\times(|R|+|E|)$) is usually significantly less than the number of $x_{cs}$ variables $|C|\times|S|$, the efficiency of the branch and bound algorithm in the MIP solver can be increased by assigning higher priority to branching on variables $ze_{ce}$ and $zr_{cr}$.

The RAP-LINI uses a linearization technique that is straightforward and that results in a MIP formulation with $|L|\times(|R|+|E|)$ additional continuous variables than RAP0. This subsection describes a relatively more sophisticated linearization scheme, which leads to another MIP formulation with possibly fewer extra variables.

When looking at the LAN traffic flowing through each rack switch, it may be appreciated that, for all c∈C and r∈R, $zr_{cr} \cdot TO_c$, is the amount of traffic originating from component c under switch r, and $$\sum_{c' \in N_c} zr_{c'r} T_{cc'}$$

is the amount of traffic originating from component c and received under switch r. Now a new variable may be defined, $$tro_{cr} = zr_{cr}TO_c - zr_{cr}\sum_{c' \in N_c} zr_{c'r}T_{cc'},$$

which captures the amount of traffic that originated from component c under switch r and leaves switch r.

By definition of $zr_{cr}$, $$tro_{cr} = \begin{cases} zr_{cr}TO_c - \sum_{c' \in N_c} zr_{c'r}T_{cc'}, & \text{if } zr_{cr} = 1; \\ 0, & \text{if } zr_{cr} = 0. \end{cases}$$

Therefore, $tro_{cr}$ can be equivalently defined as, $$tro_{cr} = \max\left\{zr_{cr}TO_c - \sum_{c' \in N_c} zr_{c'r}T_{cc'}, 0\right\}.$$

Since $tro_{cr}$ represents the amount of outgoing traffic from component c that passes through rack switch r, and the objective function tends to reduce the amount of traffic that passes through switches, the above definition can be enforced using the following two linear constraints:

$$tro_{cr} \geq zr_{cr}TO_c - \sum_{c' \in N_c} zr_{c'r}T_{cc'} \text{ and } tro_{cr} \geq 0. \quad (22)$$

That is, these constraints will be binding at optimality.

Using the new variables $tro_{cr}$, the rack switch outgoing bandwidth constraint (8) in RAP0 can be rewritten as $$\sum_{c \in C} tro_{cr} \leq BRO_r, \forall r \in R. \quad (23)$$

Similarly, the amount of LAN traffic originating from component c that leaves edge switch e can be represented using the following new variable:

$$teo_{ce} = ze_{ce}TO_c - ze_{ce}\sum_{c' \in N_c} ze_{c'e}T_{cc'}.$$

This would be enforced by the following constraints:

$$teo_{ce} \geq ze_{ce}TO_c - \sum_{c' \in N_c} ze_{c'e}T_{cc'} \text{ and } teo_{ce} \geq 0. \quad (24)$$

Then, constraint (10) of RAP0 can be rewritten as $$\sum_{c \in C} teo_{ce} \leq BEO_e, \forall e \in E. \quad (25)$$

Analogous variables $tri_{cr}$ ($tei_{ce}$) representing the amount of incoming traffic to component c under rack switch r (edge switch e) from components outside the switch can be defined, with the following additional constraints:

$$tri_{cr} \geq zr_{cr}TI_c - \sum_{c' \in N_c} zr_{c'r}T_{c'c} \text{ and } tri_{cr} \geq 0 \quad (26)$$

$$tei_{ce} \geq ze_{ce}TI_c - \sum_{c' \in N_c} ze_{c'e}T_{c'c} \text{ and } tei_{c,e} \geq 0. \quad (27)$$

Then constraints (9) and (11) of RAP0 can be rewritten as $$\sum_{c \in C} tri_{cr} \leq BRI_r, \forall r \in R \quad (28)$$

$$\sum_{c \in C} tei_{ce} \leq BRI_e, \forall e \in E. \quad (29)$$

By comparing the definition of the new variables with the objective function J2 in RAP0, it can be seen that, $$J2 =$$

$$\sum_{r \in R}\sum_{c \in C}(tro_{cr} + tri_{cr}) + \sum_{e \in E}\sum_{c \in C}(teo_{ce} + tei_{ce}) - \sum_{e \in E}\sum_{c \in C}ze_{ce}(TO_c + TI_c).$$

Since $$\sum_{e \in E}\sum_{c \in C}ze_{ce}(TO_c + TI_c) = \sum_{c \in C}(TO_c + TI_c)$$

is a constant, an equivalent objective function is the following.

$$\text{Min } J3 = \sum_{r \in R}\sum_{c \in C}(tro_{cr} + tri_{cr}) + \sum_{e \in E}\sum_{c \in C}(teo_{ce} + tei_{ce})$$

The interpretation of the objective function follows. To reduce the traffic-weighted average inter-server distance, it may be equivalent to minimize the total amount of traffic flowing on all the Ethernet links. Because the total amount of traffic originating from and received by all the application components is a constant, the total amount of traffic flowing on all the server-to-switch links is a constant. Therefore, an equivalent objective function may be to minimize the total amount of inter-switch traffic, which is exactly what J3 is. The term "inter-switch traffic" refers to the traffic flowing on a link that connects two switches. These links are typically more expensive. Further, they are more likely to get saturated because they are often shared by multiple components, or even multiple applications. By minimizing the utilization of these shared links by a single application, the likelihood of creating bottlenecks in the LAN fabric may be decreased.

This MIP formulation of the resource assignment problem is referred to as RAP-LINII. In this case, a total number of $2|C| \times (|R|+|E|)$ new continuous variables are introduced. This approach involves fewer extra variables than the RAP-LINI approach if $2|C|<|L|$, i.e., if each application component has, on average, more than 2 incident links. In case studies performed on the two mixed-integer processing formulations (RAP-LINI, RAP-LINII), the RAP-LINII formulation was found to be more efficient.

Figure 6:
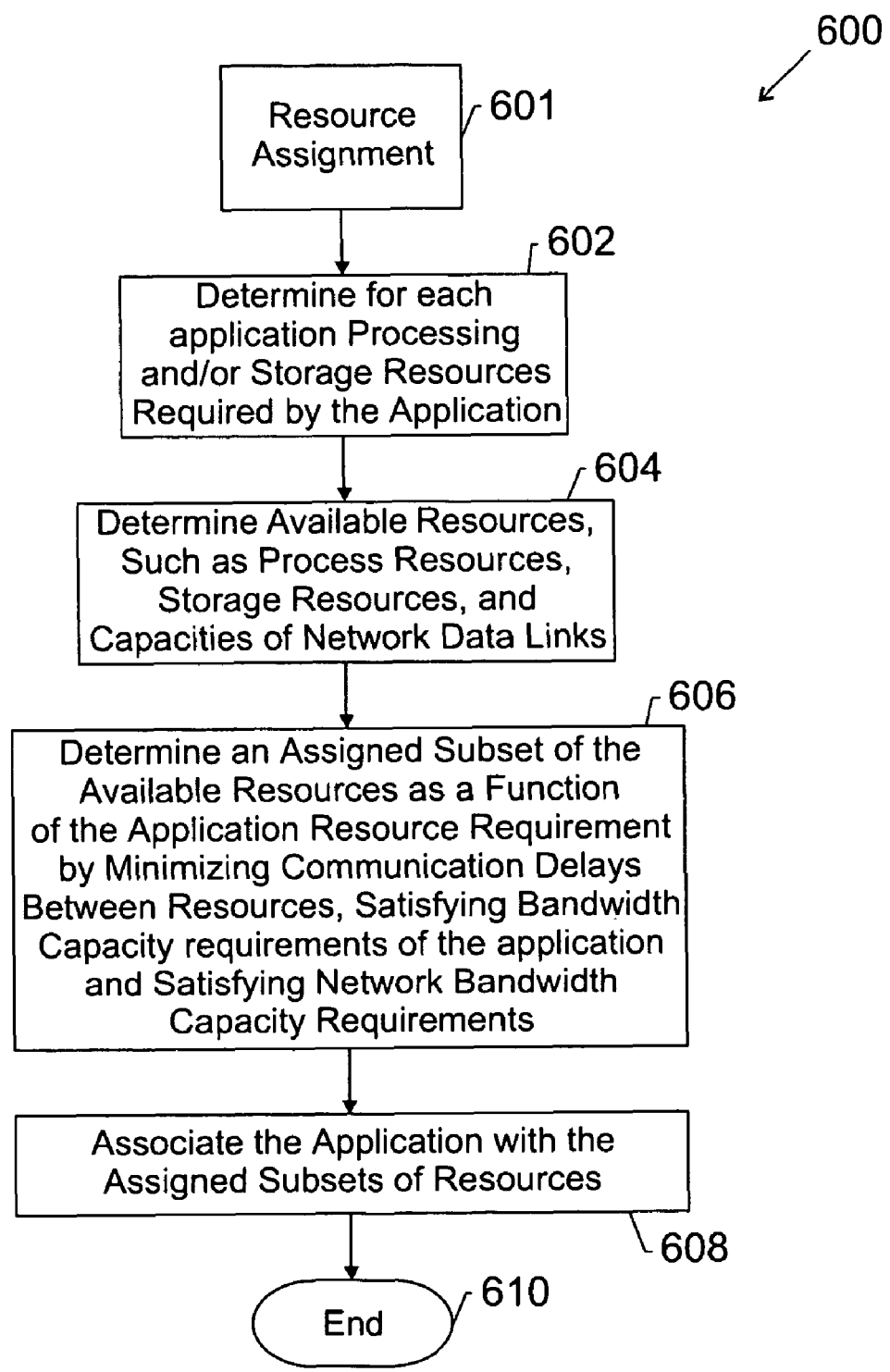
FIG. 6 is a flowchart illustrating steps in performing the resource assignment in accordance with embodiments of the present invention.

FIG. 6 is a flowchart 600 illustrating steps in performing the resource assignment (block 601) in accordance with embodiments of the present invention. The "application design" block 602 may first be performed, which involves determining for each application a set of processing, communication, and storage resources required by the application. The system parameters are also determined (block 604), including available process resources, storage resources, and capacities of network data links. These resources may be considered constant or variable depending on the application (e.g., application deployment time versus automatic failover).

Once the application and network resources have been defined, the resource assignment problem can be solved (block 606). This typically involves determining an assigned subset of the available resources as a function of the application resource requirements and the available resources. The solution may involve minimizing communication delays between resources, satisfying server attribute and bandwidth capacity requirements of the application, and satisfying network bandwidth limits. The solution (block 606) may utilize any of the described formulations for linearizing the Ethernet fabric constraints (e.g., RAP-LINI, RAP-LNII). The formulation may be chosen based on computing efficiency. Finally, the solution obtained may be used to associate (block 608) the applications with the assigned subset of resources and the flowchart may end (block 610).

Figure 7:
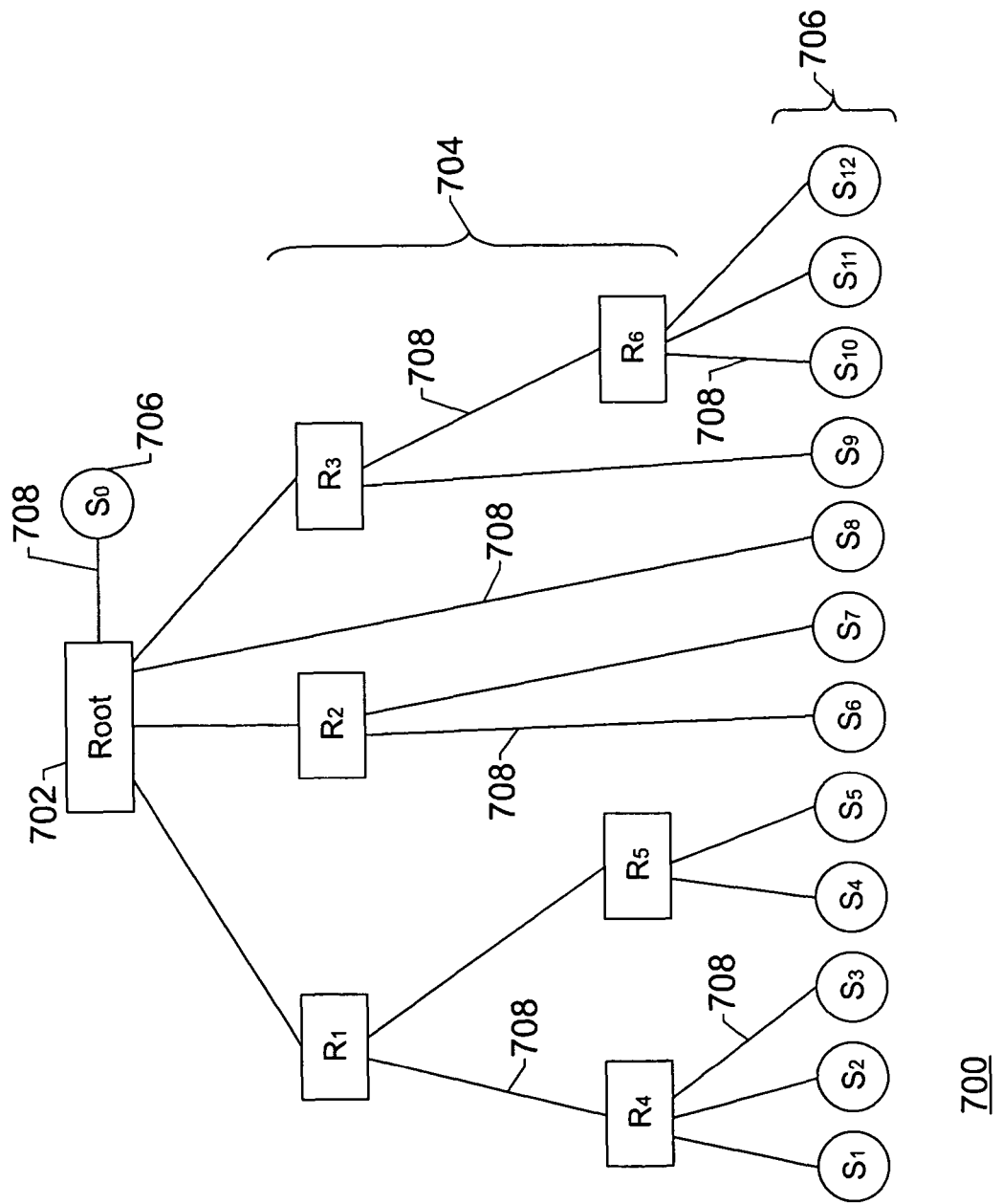
FIG. 7 is a diagram illustrating an exemplary embodiment of the tree topology of the Ethernet switching fabric in accordance with embodiments of the present invention.

FIG. 7 is a diagram illustrating an exemplary embodiment of the tree topology of the Ethernet switching fabric in accordance with embodiments of the present invention. Specifically, FIG. 7 illustrates a logical topology simplified from the original structure of a physical network. For example, in the physical network, multiple physical links may exist between two network nodes, and some or all of the switches may appear in redundant pairs for high availability purposes. As discussed regarding FIG. 5, the logical topology of FIG. 7 may be a simplified form of a complex physical network and it may be referred to as a tree network 700.

The mathematical model for the tree topology 700 contains sets and parameters shown below in Table 5.

TABLE 5

Sets and indices

| | |
|---|---|
| $s \in S$: | Set of servers. |
| $r \in R$: | Set of switches (excluding the root switch). |
| $n \in N$: | Set of nodes in the tree network (excluding the root switch), where $N = S \cup R$. |
| $n \in \hat{N}$: | Set of nodes in the tree network (including the root switch), where $\hat{N} = N \cup \{Root\}$. |
| $e \in E$: | Set of edges in the LAN fabric topology. Each edge $e = (m, n)$ is an ordered pair of two nodes m and n in $\hat{N}$. |
| $SR_r \subset S$: | Set of servers connected (directly or indirectly) to switch r. |

Parameters:

| | |
|---|---|
| B: | $|E|$-dim vector. $B_e$ or $B_{mn}$ is the link bandwidth of edge $e = (m, n) \in E$. |

The tree network 700 of FIG. 7 consists of a set of switches and a set of processing nodes (e.g., compute servers, load balancers, firewalls, etc.). The root of the tree is a root switch 702. All of the internal nodes 704 are switches ($r \in R$) and all of the leaf nodes of the tree are processing nodes ($s \in S$) 706. The processing nodes may be referred to as "servers" 706. The capability of each server 706 may be characterized by a set of attributes including non-capacitated attributes (e.g., processor type), linearly-additive capacitated attributes (e.g., disk space), and nonlinearly-additive capacitated attributes (e.g., amount of CPU resource). The server so attached to the root switch 702 may be an artificial node representing the outside world to the LAN, such as a higher level switch, a firewall, or a router. Each edge 708 in the tree ($e \in E$) may be an ordered pair of two network nodes (switch or server) representing a directed network link going from one node to another. Each edge's bandwidth capacity may be characterized by a bandwidth parameter.

The tree network 700 may be more generalized than the LAN fabric topology 500 illustrated in FIG. 5. For example, the number of layers in the tree 700 is not fixed as in the LAN fabric 500 and an arbitrary number of switch layers may exist in the network 700. Additionally, although the leaf nodes in both LAN fabric 500 and tree 700 are servers, tree 700 may be different because the servers can directly attach to the root switch 702. Further, the servers directly attached to the root switch in tree 700 may be treated the same as all other servers.

The tree topology of the LAN implies that every node (switch or server) in the network has one and only one parent node. As a result, each edge $e = (m,n)$ in the network tree can be uniquely identified using only one node, which is the child node between the two end nodes, plus the direction of the edge. For example, an edge $e = (s,r)$ or $e = (r,s)$ between server s and switch r is associated with server s. $B_{sr}$ is referred to as the outgoing bandwidth of server s, and $B_{rs}$ is referred to as the incoming bandwidth of server s. Similarly, an edge $e = (r1, r2)$ that connects switch r1 to switch r2 is associated with switch r1 if r1 is the child node, or associated with switch r2 if r2 is the child node. Therefore, instead of a single vector B, we can use the four vector parameters in Table 6 to represent network link bandwidth.

TABLE 6

| | |
|---|---|
| BSI: | $|S|$-dim vector. $BSI_s$ is the incoming bandwidth of server s. |
| BSO: | $|S|$-dim vector. $BSO_s$ is the outgoing bandwidth of server s. |
| BRI: | $|R|$-dim vector. $BRI_r$ is the incoming bandwidth of switch r. |
| BRO: | $|R|$-dim vector. $BRO_r$ is the outgoing bandwidth of switch r. |

A server can be classified into several categories based on its attribute values. Server attributes can be capacitated or non-capacitated. Table 7 illustrates a classification of different attributes and a list of common examples.

TABLE 7

Non-capacitated attributes:

Processor type, e.g. IA32 with 500 MHZ, PA-RISC 2.0, Ultra Sparc
OS type, e.g. Windows 2000, HP-UX, Solaris Capacitated and linearly-additive attributes:

Disk space, often in MBs or GBs
Virtual memory, often in MBs or GBs
NIC bandwidth, often in Mbps or Gbps Capacitated and nonlinearly-additive attributes:

Number of CPUs

Based on the classification in Table 7, the present model for server attributes may contain the following sets and parameters:

Sets and indices:

| | |
|---|---|
| $a \in A$: | Set of attributes describing a server's capability, where $A = A^{noncap} \cup A^{lin} \cup A^{nonlin}$. |
| $A^{noncap}$: | Subset of non-capacitated attributes. |
| $A^{lin}$: | Subset of capacitated and linearly-additive attributes. |
| $A^{nonlin}$: | Subset of capacitated and nonlinearly-additive attributes. |

Parameters:

| | |
|---|---|
| $VAL_{as}$: | Set of possible values of non-capacitated attribute $a \in A^{noncap}$ for server s. |
| $CAP_{as}$: | Capacity value of capacitated attribute $a \in A^{lin} \cup A^{nonlin}$ for server s. |

The node $s_0$ attached to the root switch 702 in the LAN topology may be assigned to the artificial component $c_0$. Like the node $s_0$, the artificial component $c_0$, as discussed above and illustrated in FIG. 3, also represents the outside world (e.g., the Internet). Additionally, the two edges between the root switch and so may represent the physical link between the root switch and the outside world. Accordingly, the edges may carry the total amount of traffic between the application and the outside world. If there are multiple outside worlds (e.g., the Internet, corporate intranet) that the application is communicating with, then multiple pairs of ($s_0$, $c_0$) may be used. With this relationship, the same link capacity constraints may be applied here as may be applied to determine which server in the tree network 700 should be assigned to application components. However, this can also be taken care of in a pre-processing block. If constraints are not satisfied, meaning $s_0$ is infeasible for $c_0$ in terms of link bandwidth, the problem may be infeasible immediately.

Embodiments of the present invention may formulate the previously discussed RAP as a mathematical optimization problem with a decision variable, an objective function, and a set of constraints. More specifically, embodiments of the present invention may formulate the RAP as a Mixed Integer Programming (MIP) problem. In one embodiment, a commercially available mathematical programming tool (e.g., CPLEX MIP solver) may be used to find the optimal or near-optimal solution.

In the case of assigning a single server to multiple Type II components, as discussed above, the capacitated attributes of the server may be shared by all the components that are co-located on the server. Thus, the aggregate capacity requirements from all of the components generally should not exceed the total capacity of each attribute. The specific types of constraints embodiments of the present invention use to enforce this relationship may depend on whether the attribute is linearly-additive or nonlinearly-additive. For a linearly-additive attribute, the aggregate capacity required by multiple components equals the sum of the capacities required by each individual component. For a nonlinearly-additive attribute, in addition to the sum, there is a fixed overhead associated with hosting more than one component on a server, as well as an incremental overhead associated with each additional component.

Embodiments of the present invention may solve a resource assignment problem in a network fabric with a generalized tree topology as opposed to tree networks 500 with special structures. In accordance with FIG. 7, embodiments of the present invention may apply to tree networks 700 having any number of layers of switches 702, where the topology can be asymmetric and the servers 704 can be directly connected to any switch 702 on any layer. Additionally, embodiments of the present invention may apply to applications with smaller components that may share a common server with other components. A server may be running multiple application components under the same operating system or partitioned into multiple virtual servers using virtual machine technologies. For example, embodiments of the present invention enable resource assignment techniques to be applied in server consolidation, which is a common practice, driven by the need of cost reduction in the IT infrastructure.

In embodiments of the present invention relating to FIG. 7, the optimization problem decides which server should be assigned to which application component. This may be represented by the following matrix of binary variables. For all $c \in C$ and $s \in S$, $$x_{cs} = \begin{cases} 1 & \text{server } s \text{ assigned to component } c; \\ 0 & \text{otherwise.} \end{cases}$$

In addition, for all $c \in C$ and $r \in R$, $$z_{cr} = \begin{cases} 1 & \text{switch } s \text{ assigned to component } c; \\ 0 & \text{otherwise.} \end{cases}$$

Here, a switch may be assigned to a component if and only if at least one server connected (directly or indirectly) under the switch is assigned to that component. In other words, $z_{cr}=1$ if and only if $x_{cs}=1$ for some $s \in SR_r$. Therefore, $z_{cr}$ variables and $x_{cs}$ variables are related as follows:

$$\sum_{s \in SR_r} x_{cs} = z_{cr}, \quad \forall c \in C, r \in R.$$

As described in relation to FIG. 5 and as may be applicable to FIG. 7, the search space may be limited for these binary variables by pre-computing their corresponding feasibility matrices. The feasibility matrix FS between application components and servers may be defined as $$FS_{cs} = \begin{cases} 1 & \text{server } s \text{ can be assigned to component } c; \\ 0 & \text{otherwise.} \end{cases}$$

For all $s \in S$ and $c \in C$, $FS_{cs}=1$ if only if the following is true:

a) $VREQ_{ac} \cap VAL_{as} \neq \Phi$ for all $a \in A^{noncap}$;

b) $CREQ_{ac} \leq CAP_{as}$ for all $a \in A^{lin} \cup A^{nonlin}$;

c) $TI_c \leq BSI_s$ and $TO_c \leq BSO_s$.

In addition, FR may be the feasibility matrix for the switches. $FR_{cr}=1$ if and only if $FS_{cs}=1$ for some $s \in SR_r$.

Moreover, based on the server feasibility matrix FS, the set of feasible components may be defined as $C_s = \{c \in C: FS_{cs}=1\}$, for each server s. Again, a component can be either Type I (does not allow sharing) or Type II (allows sharing). Therefore, the set $C_s$ may be partitioned accordingly into two subsets. First, $C_s^1$, the set of Type I components that server s is feasible for, i.e., $C_s^1 = C_s \cap C^1$. Thus, server s can be assigned to at most one component in $C_s^1$. Second, $C_s^m$, the set of Type II components that server s is feasible for, i.e., $C_s^m = C_s \cap C^m$. This means, server s may be assigned to multiple components in $C_s^m$ at the same time. Hence, $C_s = C_s^1 \cup C_s^m$, and $C_s^1 \cap C_s^m = \emptyset$.

Additionally, a new variable may be defined. For all $c \in C$ and $r \in R$, $$tro_{cr} = z_{cr}TO_c - z_{cr}\sum_{c' \in N_c} z_{c'r}T_{cc'}.$$

The intuition is that $z_{cr}TO_c$ is the total amount of traffic originating from component c under switch r, and that $$z_{cr}\sum_{c' \in N_c} z_{c'r}T_{cc'}$$

is the amount of traffic originating from component c under switch r and received by servers under switch r (i.e., the intra-switch traffic at switch r that originated from component c.) Therefore, $tro_{cr}$ is the amount of traffic that originated from component c under switch r and passes through switch r.

Similarly, this definition may be provided $$tri_{cr} = z_{cr}TI_c - z_{cr}\sum_{c' \in N_c} z_{c'r}T_{c'c}$$

to represent the amount of incoming traffic to component c under switch r from components outside the switch.

The traffic coming into and going out the server may be calculated in a similar fashion. Thus, the decision variables $tso_{cs}$ and $tsi_{cs}$ may be defined as the amount of traffic originating from component c that goes out of, or comes into, server s, respectively, as a result of the assignment. These variables are defined by the following equations. For all c∈C and s∈S, $$tso_{cs} = x_{cs}TO_c - x_{cs}\sum_{c' \in C_s^m} x_{c's}T_{cc'},$$

$$tsi_{cs} = x_{cs}TI_c - x_{cs}\sum_{c' \in C_s^m} x_{c's}T_{c'c}.$$

It should be noted that, if server s is assigned to only one component c, i.e., $x_{cs}=1$, then $tso_{cs}=TO_c$, and $tsi_{cs}=TI_c$. However, if server s is assigned to component c and any other component c' in $C_s^m$ at the same time, communication between these two components is considered internal to the server, and thus does not consume bandwidth capacity on the server's external link.

The objective function is to minimize the traffic-weighted average inter-server distance, where distance is measured in terms of network hop count. Let $D_{ss'}$ be the distance between two servers s and s', and $TA_{ss'}$ be the amount of LAN traffic from server s to server s' as a result of server assignment. Then the objective function is $$\text{Min } J1 = \sum_{s,s' \in S} D_{ss'} TA_{ss'}.$$

Since $TA_{ss'} = \sum_{c \in C}\sum_{c' \in N_c} x_{cs}T_{cc'}x_{c's'}$, then $$J1 = \sum_{c \in C}\sum_{c' \in N_c}\sum_{s,s' \in S} x_{cs}D_{ss'}T_{cc'}x_{c's'}.$$

The value of $D_{ss'}$ depends on the relative location of servers s and s'. For example, $D_{ss'}=2$ if both servers are directly connected to the same switch. It may be noted that, when s =s', $D_{ss}=0$, meaning that if two communicating components are assigned to the same server s, then the network hop count between these two components becomes zero. At the same time, $$TA_{ss} = \sum_{c \in C}\sum_{c' \in N_c} x_{cs}T_{cc'}x_{c's},$$

which represents the total amount of communication inside server s. The goal of the objective function may be to keep servers that communicate heavily closer to each other in the network. For example, if $T_{cc'}$ is large, it may be preferable to assign both components c and c' to the same server, if possible. If not, assigning them to two servers under the same switch may be preferred.

Because $D_{ss'}$ is not a constant, calculating J1 may not be straightforward for given values of $x_{cs}$. Here a different representation of the same objective function that is easier to compute may be presented. Minimizing J1 is equivalent to minimizing the total amount of application traffic on all the network links. The amount of traffic originating from component c and passing through edge e, and the summation of such traffic from all the components on all the edges should be taken into consideration. Since each edge can be associated with either a server or a switch, the objective function can be rewritten as:

$$\text{Min } J1 = \sum_{c \in C}\left(\sum_{s \in S}(tso_{cs} + tsi_{cs}) + \sum_{r \in R}(tro_{cr} + tri_{cr})\right).$$

This is a linear function of all the continuous link traffic variables. It may lead to another interpretation of the objective function. Because each network link may be shared by multiple application components, multiple servers, sometimes even multiple applications, by minimizing the utilization of these shared links by a single application, the likelihood of creating bottlenecks in the LAN fabric may be reduced.

The total amount of traffic passing through switch r and going to its parent switch is $$\sum_{c \in C} tro_{cr},$$

which may be bounded by the outgoing link bandwidth at the switch. Hence, $$\sum_{c \in C} tro_{cr} \leq BRO_r, \quad \forall r \in R.$$

Similarly, the total amount of traffic received by switch r from its parent switch may be bounded by the incoming link bandwidth at the switch. That is, $$\sum_{c \in C} tri_{cr} \leq BRI_r, \quad \forall r \in R.$$

The bandwidth constraints for the links that connect a server to a switch may be derived in a similar fashion, i.e., the total amount of traffic going out of and coming into each server should be bounded by the corresponding link capacity. Therefore, $$\sum_{c \in C} tso_{cs} \leq BSO_s, \quad \forall s \in S,$$

$$\sum_{c \in C} tsi_{cs} \leq BSI_s, \quad \forall s \in S.$$

In accordance with the above, $$tro_{cr} = z_{cr}TO_c - z_{cr}\sum_{c' \in N_c} z_{c'r}T_{cc'},$$

which shows that the variables tro may be expressed as a non-linear function of the z variables. This nonlinear relationship can be linearized in the following way. By definition of $z_{cr}$, $$tro_{cr} = \begin{cases} z_{cr}TO_c - \sum_{c' \in N_c} z_{c'r}T_{cc'}, & \text{if } z_{cr} = 1; \\ 0, & \text{if } z_{cr} = 0. \end{cases}$$

Therefore, $tro_{cr}$ can be equivalently defined as, $$tro_{cr} = \max\{z_{cr}TO_c - \sum_{c' \in N_c} z_{c'r}T_{cc'}, 0\}.$$

Because the objective function drives $tro_{cr}$ towards smaller values, the above relationship can be enforced using the following two linear constraints:

$$tro_{cr} \geq zr_{cr} \cdot TO_c - \sum_{c' \in N_c} zr_{c'r}T_{cc'} \text{ and } tro_{cr} \geq 0.$$

That is, these constraints will be binding at optimality.

Similarly, the relationship between $tri_{cr}$ and $z_{cr}$ can be translated into the following two linear constraints:

$$tri_{cr} \geq zr_{cr} \cdot TI_c - \sum_{c' \in N_c} zr_{c'r}T_{c'c} \text{ and } tri_{cr} \geq 0.$$

Also, $$tso_{cs} = x_{cs}TO_c - x_{cs}\sum_{c' \in C_s^m} x_{c's}T_{cc'}$$

may be defined as the amount of outgoing traffic at server s that originated from component c. By definition of $x_{cs}$, $$tso_{cs} = \begin{cases} x_{cs}TO_c - \sum_{c' \in C_s^m} x_{c's}T_{cc'}, & \text{if } x_{cs} = 1; \\ 0, & \text{if } x_{cs} = 0. \end{cases}$$

Therefore, $tso_{cs}$ can equivalently be defined as $$tso_{cs} = \max\{x_{cs}TO_c - \sum_{c' \in C_s^m} x_{c's}T_{cc'}, 0\}.$$

Since the objective function drives $tso_{cs}$ towards smaller values, the above relationship can be enforced using the following two linear constraints:

$$tso_{cs} \geq x_{cs}TO_c - \sum_{c' \in C_s^m} x_{c's}T_{cc'} \text{ and } tso_{cs} \geq 0.$$

That is, these constraints will be binding at optimality. Similarly, $tsi_{cs}$ can be linearized as follows:

$$tsi_{cs} \geq x_{cs}TI_c - \sum_{c' \in C_s^m} x_{c's}T_{c'c} \text{ and } tsi_{cs} \geq 0.$$

If a single server is assigned to host multiple application components at the same time, either under the same operating system, or possibly under different operating systems using virtual machines, it may be necessary to insure that, first, the server is feasible for all hosted components; and second, the aggregate capacity required by all these components does not exceed the capacities of the server's capacitated attributes.

For any component $c \in C$, the pre-computed server feasibility matrix FS may decide whether a particular server can be assigned to this component. However, for components of Type II, additional attribute capacity constraints may be needed to decide whether a server can be shared by multiple such components. For linearly-additive attributes and nonlinearly-additive attributes, the constraints come in different forms.

For linearly-additive capacitated attributes, the following capacity constraint is considered.

$$\sum_{c \in C_s^m} CREQ_{ac}x_{cs} \leq CAP_{as}, \quad \forall a \in A^{lin}, s \in S \tag{30}$$

At the same time, the following constraint may be required:

$$x_{cs} + \sum_{c' \in C_s^1} x_{c's} \leq 1, \quad \forall c \in C_s^m, s \in S \tag{31}$$

This constraint ensures that the same server is not assigned to both a component of Type I and a component of Type II.

For nonlinearly-additive capacitated attributes, both a fixed overhead, $\Theta_{as}$, and an incremental overhead, $\theta_{as}$, on the capacity of each shared attribute $a \in A^{nonlin}$ of server s may be considered. The fixed overhead may be for having more than one component on a given server. The incremental overhead may be for each additional component. Overhead values can be relative or absolute. For absolute overhead values the following constraint applies.

$$\sum_{c \in C_s^m} CREQ_{ac}x_{cs} + \Theta_{as}\delta_s + \theta_{as}\left(\sum_{c \in C_s^m} x_{cs} - 1\right) \leq CAP_{as}, \tag{32}$$

$$\forall a \in A^{nonlin}, s \in S.$$

In case the overhead values, $\Phi_{as}$ and $\phi_{as}$, are given in relative terms, the corresponding overhead values may be set in absolute terms by computing $\Theta_{as} = \Phi_{as}CAP_{as}$ and $\theta_{as} = \phi_{as}CAP_{as}$, and using constraint (32).

In the above constraint, a new binary variable may be used that captures the creation of a fixed overhead whenever a plurality of components share the same server.

$$\delta_s = \begin{cases} 1 & \text{more than one component assigned to server } s; \\ 0 & \text{otherwise.} \end{cases}$$

The following logical constraint ensures that $$\delta_s = 1 \text{ if } \sum_{c \in C_s^m} x_{cs} - 1 > 0.$$

$$\sum_{c \in C_s^m} x_{cs} - 1 \leq |C_s^m| \delta_s$$

Another logical constraint ensures that $$\delta_s = 0 \text{ if } \sum_{c \in C_s^m} x_{cs} \leq 1.$$

$$\sum_{c \in C_s^m} x_{cs} \geq 1.1 \delta_s$$

The variables $\delta_s$ can be fairly numerous. They can be removed from the formulation as follows. The capacity constraint with the absolute overhead values may be expressed as follows:

$$\sum_{c \in C_s^m} (CREQ_{ac} + \theta_{as}) x_{cs} + \Theta_{as} - \theta_{as} \leq CAP_{as}, \quad (33)$$

$$\forall a \in A^{nonlin}, s \in S$$

The variables $\delta_s$ are set to 1 in the above constraint, and thus do not appear in the inequality. Constraint (33) and constraint (32) may be equivalent as long as some corner cases are addressed. The following three situations should be considered.

1. When $$\sum_{c \in C_s^m} x_{cs} > 1, \delta_s = 1,$$

constraint (32) and (33) are exactly the same.

2. When $$\sum_{c \in C_s^m} x_{cs} < 1, \delta_s = 0,$$

the left hand side of both constraints (32) and (33) become negative, both constraints are satisfied automatically.

3. When $$\sum_{c \in C_s^m} x_{cs} = 1, \delta_s = 0,$$

constraint (32) becomes $$\sum_{c \in C_s^m} CREQ_{ac} x_{cs} \leq CAP_{as}, \forall a \in A^{nonlin}, s \in S, \quad (34)$$

and constraint (33) becomes $$\sum_{c \in C_s^m} CREQ_{ac} x_{cs} + \Theta_{as} \leq CAP_{as}, \forall a \in A^{nonlin}, s \in S, \quad (35)$$

Constraint (35) is tighter than constraint (34). If for some server s and some component $c \in C_s^m$, there exists a nonlinearly-additive attribute $a \in A^{nonlin}$, such that $CREQ_{ac} + \Theta_{as} > CAP_{as}$, then constraint (35) is violated, yet constraint (34) is satisfied automatically by the definition of $C_s^m$. However, these special cases can be eliminated by pre-processing. The following rule may be defined:

For all $s \in S$ and $c \in C_s$, if $\exists a \in A^{nonlin}$ s.t. $CREQ_{ac} + \Theta_{as} > CAP_{as}$, then $c \in C_s^1$.

If the above condition holds, then at least one attribute capacity constraint will be violated if component c shares server s with another component. Hence, component c should really be Type I from the perspective of sharing server s. Therefore, component subsets $C_s^1$ and $C_s^m$ are computed during pre-processing as follows.

$$C_s^1 = \{c \in C^1: FS_{cs} = 1\} \cup$$
$$\{c \in C: CREQ_{ac} + \Theta_{as} > CAP_{as}, \exists a \in A^{nonlin}, FS_{cs} = 1\},$$
$$C_s^m = \{c \in C^m: FS_{cs} = 1, CREQ_{ac} + \Theta_{as} \leq CAP_{as}, \forall a \in A^{nonlin}\}.$$

With this classification of feasible components, for all servers $s \in S$ and all components $c \in C_s^m$, constraints (34) and (35) are both satisfied automatically for all $a \in A^{nonlin}$. Thus it is demonstrated that constraints (32) and (33) are equivalent to each other for all three cases. Therefore, constraint (33) can be used as the capacity constraint for nonlinearly-additive attributes, and the use of binary variables $\delta_s$ is not necessary.

In summary, the reformulated optimization problem for RAP follows (the LAN part only).

$$\text{Min} \sum_{c \in C} \left( \sum_{s \in S} (tso_{cs} + tsi_{cs}) + \sum_{r \in R} (tro_{cr} + tri_{cr}) \right)$$

$$\sum_{s \in S} x_{cs} = 1, \forall c \in C$$

$$\sum_{c \in C} x_{cs} \leq 1, \forall s \in S$$

$$\sum_{s \in SR_r} x_{cs} = z_{cr}, \forall c \in C, r \in R$$

$$\sum_{c \in C} tso_{cs} \leq BSO_s, \forall s \in S$$

$$\sum_{c \in C} tsi_{cs} \leq BSI_s, \forall s \in S$$

$$\sum_{c \in C} tro_{cr} \leq BRO_r, \forall r \in R$$

$$\sum_{c \in C} tri_{cr} \leq BRI_r, \forall r \in R$$

$$x_{cs} TO_c - \sum_{c' \in N_c} x_{c's} T_{cc'} \leq tso_{cs}, \forall c \in C, s \in S$$

$$x_{cs} TI_c - \sum_{c' \in N_c} x_{c's} T_{c'c} \leq tsi_{cs}, \forall c \in C, s \in S$$

-continued $$z_{cr}TO_c - \sum_{c' \in N_c} z_{c'r}T_{cc'} \le tro_{cr}, \forall c \in C, r \in R$$

$$z_{cr}TI_c - \sum_{c' \in N_c} z_{c'r}T_{c'c} \le tri_{cr}, \forall c \in C, r \in R$$

$$\sum_{c \in C_s^m} CREQ_{ac} * x_{cs} \le CAP_{as}, \forall a \in A^{lin}, s \in S$$

$$\sum_{c \in C_s^m} (CREQ_{ac} + \theta_{as})x_{cs} \le CAP_{as} - (\Theta_{as} - \theta_{as}),$$

$$\forall a \in A^{nonlin}, s \in S$$

$$x_{cs} + \sum_{c' \in C_s^l} x_{c's} \le 1, \forall c \in C_s^m, s \in S$$

$$x_{cs} \in \{0, FS_{cs}\}, z_{cr} \in \{0, FR_{cr}\}, tso_{cs} \ge 0, tsi_{cs} \ge 0,$$

$$tro_{cr} \ge 0, tri_{cr} \ge 0$$

The above optimization problem is linear, with a combination of $|C| \times |N|$ binary variables and $2|C| \times |N|$ continuous variables. This is a mixed integer programming (MIP) formulation, as discussed previously, that can be solved using commercial solvers, such as CPLEX.

Individual modules and components relating to embodiments of the present invention and illustrated in FIGS. 1-7 may comprise hardware, software or some combination thereof. Further, while illustrated embodiments may separately delineate specific modules, in other embodiments, individual modules may be split into multiple modules or combined into a single module. For example, in some embodiments of the present invention, illustrated modules do not operate in the illustrated order. Further, individual modules may be broken into multiple modules or multiple modules may be combined into a single module.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A processor-based method for allocating hardware resources to computing applications, the hardware resources organized within a network topology, the computing applications organized within a distributed architecture, the method comprising:
  determining, by a processor, which of the hardware resources are to be assigned to each computing application by solving a resource-assignment problem pursuant to a model representing the computing applications within the distributed architecture, specifically to minimize a network traffic-weighted inter-hardware resource distance while satisfying processing, communication, and storage requirements of each computing application without exceeding capacity limits of a network underlying the network topology; and,
  assigning, by the processor, the hardware resources to the computing applications in accordance with determinations that have been made as to which of the hardware resources are to be assigned to each computing application,
  wherein the model is a first model, and wherein determining which of the hardware resources are to be assigned to each computing application by solving the resource-assignment problem pursuant to the first model representing the computing applications within the distributed architecture comprises:
    employing a second model accommodating a scenario in which more than one of the computing applications is assigned to a same one of the hardware resources,
  wherein the second model comprises:
    a first computing application that is a member of a set of all the computing applications within the distributed architecture;
    a first data file that is a member of a set of all the data files to be stored on the hardware resources;
    a first parameter that is an amount of write traffic from the computing application to the first data file and that is a first matrix; and,
    a second parameter that is an amount of read traffic to the computing application from the first data file and that is a second matrix.

2. The method of claim 1, wherein determining which of the hardware resources are to be assigned to each computing application by solving the resource-assignment problem pursuant to the model representing the computing applications within the distributed architecture further comprises:
  utilizing a generalized tree topology for the network topology within which the hardware resources are organized, the generalized tree topology essentially consisting of a plurality of processing nodes representing the hardware resources and a plurality of switches interconnecting the processing nodes within the network topology,
  wherein the generalized tree topology employs the processing nodes and the switches in lieu of specifying one or more of:
    first rack switches that connect hardware resources to other hardware resources;
    second rack switches that connect hardware resources to switches;
    edge switches that connect switches to other switches,
  such the generalized tree topology does not distinguish among types of switches.

3. The method of claim 1, wherein determining which of the hardware resources are to be assigned to each computing application by solving the resource-assignment problem pursuant to the model, specifically to minimize the traffic-weighted inter-hardware resource distance, further comprises:
  minimizing a total amount of network traffic among a plurality of switches interconnecting the hardware resources within the network topology, where a total amount of network traffic among the computing applications is constant, and where a total amount of network traffic on network links directly connecting hardware resources with switches is constant.

4. The method of claim 1, wherein determining which of the hardware resources are to be assigned to each computing application by solving the resource-assignment problem pursuant to the model, specifically to minimize the traffic-weighted inter-hardware resource distance, further comprises minimizing $$\sum_{s,s' \in S} DIST_{ss'} * TSS_{ss'},$$

where s and s' are hardware resources, $DIST_{ss'}$ is a distance between the hardware resources s and s', and $TSS_{ss}$ is an amount of network traffic from the hardware resource s to the hardware resource s' resulting from assignment of the hardware resources to the computing applications.

5. The method of claim 1, wherein determining which of the hardware resources are to be assigned to each computing application by solving the resource-assignment problem pursuant to the model, specifically to minimize the traffic-weighted inter-hardware resource distance, further comprises minimizing $$2\sum_{c \in C}(TO_c + TI_c) + \sum_{r \in R}\sum_{c \in C} zr_{cr}(TO_c + TI_c) - 2\sum_{r \in R}\sum_{c \in C}\sum_{c' \in N_c} zr_{cr}T_{cc'}zr_{c'r} - \sum_{e \in E}\sum_{c \in C}\sum_{c' \in N_c} 2ze_{ce}T_{cc'}ze_{c'e},$$

where c is a computing application that is a member of a set C of all the computing applications, e is an edge switch that is a member of a set E of all edge switches that connect switches to other switches, r is a rack switch that is a member of a set R of all rack switches that connect hardware resources to other hardware resources, c' is a computing application that is a member of a set $N_c$ of all the computing applications that communicate with the first computing application c, $zr_{ab}$ is one if a rack switch a is assigned to the computing application b and is otherwise zero, $ze_{fg}$ is ene if an edge switch f is assigned to the computing application g and is otherwise zero, $TO_c$ is a total amount of outgoing network traffic from the computing application c, $TI_c$ is a total amount of incoming network traffic to the computing application c, and $T_{cc'}$ is an amount of communication traffic from the computing application c to the computing application c'.

6. The method of claim 1, wherein the first model comprises:
a first computing application c that is a member of a set C of all the computing applications within the distributed architecture;
a link l that is a member of a set L of all directed links within an application architecture graph representing the distributed architecture; and,
a second computing application c' that is a member of a set $N_c$ of all the computing applications that communicate with the first computing application c, where the set of all the computing applications that communicate with the first computing application c is $N_c = \{c' \in C: (c, c') \in L\}.$

7. The method of claim 6, wherein the first model further comprises:
a parameter $T_{cc'}$ that is an amount of communication traffic from the first computing application c to the second computing application c' and is a matrix having a dimension of $|C| \times |C|;$ a parameter $T_{c'c}$ that is an amount of communication traffic from the second computing application c' to the second computing application c and is a matrix having a dimension of $|C| \times |C|;$ a parameter $TO_c$ that is a total amount of outgoing network traffic from the first computing application c and that is equal to $$\sum_{c' \in N_c} T_{cc'};$$

a parameter $TI_c$ that is a total amount of incoming network traffic to the first computing application c and that is equal to $$\sum_{c' \in N_c} T_{c'c};$$

an attribute $VREQ_{ac}$ of the first computing application c that has a value of being present or not present; and,
an attribute $CREQ_{ac}$ of the first computing application c that has a numeric value.

8. The method of claim 1, wherein the first model assumes that a local-area network of the network topology is logically representable as a tree.

9. The method of claim 1, wherein the first model comprises:
a hardware resource s that is a member of a set S of all the hardware resources within the network topology;
a rack switch r that is a member of a set R of all rack switches that connect hardware resources to other hardware resources;
an edge switch e that is a member of a set E of all edge switches that connect switches to other switches;
a set of rack switches $R_e$ that is a subset of the set R of all the rack switches that are connected to the edge switch e, such that $R_e \subset R$;
a set of hardware resources $SR_r$ that is a subset of the set S of all the hardware resources that are connected to the rack switch r, such that $SR_r \subset S$;
a set of hardware resources $SE_e$ that is a subset of the set S of all the hardware resources that are connected under the edge switch e, such that $SE_e \subset S$; and,
an attribute p that is a member of a set P of all attributes required by the hardware resource s.

10. The method of claim 9, wherein the first model further comprises:
a parameter $BSI_s$ that is an incoming bandwidth of the hardware resource s;
a parameter $BSO_s$ that is an outgoing bandwidth of the hardware resource s;
a parameter $BRI_r$ that is an incoming bandwidth of the rack switch r;
a parameter $BRO_r$ that is an outgoing bandwidth of the rack switch r;
a parameter $BEI_e$ that is an incoming bandwidth of the edge switch e;
a parameter $BEO_e$ that is an outgoing bandwidth of the edge switch e; and,
a set of parameters $V_{sp}$ that is a set of all possible values for the attribute p of the hardware resource s.

11. A system for allocating hardware resources to computing applications, the hardware resources organized within a network topology, the computing applications organized within a distributed architecture, the system comprising:
hardware;
a first software module implemented by the hardware to determine which of the hardware resources are to be assigned to each computing application by solving a resource-assignment problem pursuant to a model representing the computing applications within the distributed architecture, specifically to minimize a network traffic-weighted inter-hardware resource distance while satisfying processing, communication, and storage requirements of each computing application without exceeding capacity limits of a network underlying the network topology; and, a second software module implemented by the hardware to assign the hardware resources to the computing applications in accordance with determinations that have been made as to which of the hardware resources are to be assigned to each computing application, wherein the model comprises:
- a first computing application that is a member of a set of all the computing applications within the distributed architecture;
- a link that is a member of a set of all directed links within an application architecture graph representing the distributed architecture;
- a second computing application that is a member of a set of all the computing applications that communicate with the first computing application;
- a first parameter that is an amount of communication traffic from the first computing application to the second computing application and is a first matrix;
- a second parameter that is an amount of communication traffic from the second computing application to the first computing application and is a second matrix;
- a third parameter that is a total amount of outgoing network traffic from the first computing application;
- a fourth parameter that is a total amount of incoming network traffic to the first computing application c;
- a first attribute of the first computing application that has a value of being present or not present; and, a second attribute of the first computing application that has a numeric value, wherein each of the first matrix and the second matrix has a dimension defined by the set of all the computing applications that communicate with the first computing application.

12. The system of claim 11, wherein the first software component is to determine which of the hardware resources are to be assigned to each computing application by solving the resource-assignment problem pursuant to the model representing the computing applications within the distributed architecture by:
utilizing a generalized tree topology for the network topology within which the hardware resources are organized, the generalized tree topology essentially consisting of a plurality of processing nodes representing the hardware resources and a plurality of switches interconnecting the processing nodes within the network topology,
wherein the generalized tree topology employs the processing nodes and the switches in lieu of specifying one or more of:
- first rack switches that connect hardware resources to other hardware resources;
- second rack switches that connect hardware resources to switches;
- edge switches that connect switches to other switches, such the generalized tree topology does not distinguish among types of switches.

13. The system of claim 11, wherein the model is a first model, and wherein the first software component is to determine which of the hardware resources are to be assigned to each computing application by solving the resource-assignment problem pursuant to the first model representing the computing applications within the distributed architecture by:
employing a second model accommodating a scenario in which more than one of the computing applications is assigned to a same one of the hardware resources.

14. The system of claim 11, wherein the first software component is to determine which of the hardware resources are to be assigned to each computing application by solving the resource-assignment problem pursuant to the model, specifically to minimize the traffic-weighted inter-hardware resource distance, by:
minimizing a total amount of network traffic among a plurality of switches interconnecting the hardware resources within the network topology, where a total amount of network traffic among the computing applications is constant, and where a total amount of network traffic on network links directly connecting hardware resources with switches is constant.

15. The system of claim 11, wherein the first software component is to determine which of the hardware resources are to be assigned to each computing application by solving the resource-assignment problem pursuant to the model, specifically to minimize the traffic-weighted inter-hardware resource distance, by minimizing $$\sum_{s,s' \in S} DIST_{ss'} * TSS_{ss'},$$

where s and s' are hardware resources, $DIST_{ss'}$ is a distance between the hardware resources s and s', and $TSS_{ss'}$ is an amount of network traffic from the hardware resource s to the hardware resource s' resulting from assignment of the hardware resources to the computing applications.

16. A system for allocating hardware resources to computing applications, the hardware resources organized within a network topology, the computing applications organized within a distributed architecture, the system comprising:
hardware;
first means, implemented by the hardware, for determining which of the hardware resources are to be assigned to each computing application by solving a resource-assignment problem pursuant to a model representing the computing applications within the distributed architecture, specifically to minimize a network traffic-weighted inter-hardware resource distance while satisfying processing, communication, and storage requirements of each computing application without exceeding capacity limits of a network underlying the network topology; and,
second means, implemented by the hardware, for assigning the hardware resources to the computing applications in accordance with determinations that have been made as to which of the hardware resources are to be assigned to each computing application,
wherein the model comprises:
- a first computing application c that is a member of a set C of all the computing applications within the distributed architecture;
- a link l that is a member of a set L of all directed links within an application architecture graph representing the distributed architecture;
- a second computing application c' that is a member of a set $N_c$ of all the computing applications that communicate with the first computing application c, where the set of all the computing applications that communicate with the first computing application c is $N_c = \{c' \in C : (c,c') \in L\};$ a parameter $T_{cc'}$ that is an amount of communication traffic from the first computing application c to the second computing application c' and is a matrix having a dimension of $|C| \times |C|$;

a parameter $T_{c'c}$ that is an amount of communication traffic from the second computing application c' to the second computing application c and is a matrix having a dimension of $|C| \times |C|$;

a parameter $TO_c$ that is a total amount of outgoing network traffic from the first computing application c and that is equal to $$\sum_{c' \in N_c} T_{cc'};$$

a parameter $TI_c$ that is a total amount of incoming network traffic to the first computing application c and that is equal to $$\sum_{c' \in N_c} T_{c'c};$$

an attribute $VREQ_{ac}$ of the first computing application c that has a value of being present or not present; and, an attribute $CREQ_{ac}$ of the first computing application c that has a numeric value.

17. The system of claim 16, wherein the first means determines which of the hardware resources are to be assigned to each computing application by solving the resource-assignment problem pursuant to the model, specifically to minimize the traffic-weighted inter-hardware resource distance, by:

minimizing a total amount of network traffic among a plurality of switches interconnecting the hardware resources within the network topology, where a total amount of network traffic among the computing applications is constant, and where a total amount of network traffic on network links directly connecting hardware resources with switches is constant.

18. The system of claim 16, wherein the first means determines which of the hardware resources are to be assigned to each computing application by solving the resource-assignment problem pursuant to the model, specifically to minimize the traffic-weighted inter-hardware resource distance, by minimizing $$\sum_{s,s' \in S} DIST_{ss'} * TSS_{ss'},$$

where s and s' are hardware resources, $DIST_{ss'}$ is a distance between the hardware resources s and s', and $TSS_{ss'}$ is an amount of network traffic from the hardware resource s to the hardware resource s' resulting from assignment of the hardware resources to the computing applications.

* * * * *

UNITED STATES PATENT AND TRADEMARK OFFICE
CERTIFICATE OF CORRECTION

PATENT NO.       : 7,865,582 B2
APPLICATION NO.  : 10/915823
DATED            : January 4, 2011
INVENTOR(S)      : Cipriano Santos et al.

It is certified that error appears in the above-identified patent and that said Letters Patent is hereby corrected as shown below:

In column 31, line 2, in Claim 4, delete "$TSS_{ss}$" and insert -- $TSS_{ss'}$ --, therefor.

In column 31, line 29, in Claim 5, delete "ene" and insert -- one --, therefor.

Signed and Sealed this
Twelfth Day of April, 2011

David J. Kappos
*Director of the United States Patent and Trademark Office*